(12) United States Patent
Kousaridas et al.

(10) Patent No.: US 11,943,663 B2
(45) Date of Patent: Mar. 26, 2024

(54) DEVICE AND METHOD FOR PROVIDING A QUALITY OF SERVICE FUNCTION

(71) Applicant: Huawei Technologies Co., Ltd., Shenzhen (CN)

(72) Inventors: Apostolos Kousaridas, Munich (DE); Emmanouil Pateromichelakis, Munich (DE); Chan Zhou, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 448 days.

(21) Appl. No.: 17/203,415

(22) Filed: Mar. 16, 2021

(65) Prior Publication Data

US 2021/0274387 A1 Sep. 2, 2021

Related U.S. Application Data

(63) Continuation of application No. PCT/EP2018/075035, filed on Sep. 17, 2018.

(51) Int. Cl.
*H04W 28/24* (2009.01)
*H04W 24/10* (2009.01)
(Continued)

(52) U.S. Cl.
CPC ........... *H04W 28/24* (2013.01); *H04W 24/10* (2013.01); *H04W 28/0268* (2013.01);
(Continued)

(58) Field of Classification Search
CPC ..... H04W 28/00; H04W 28/16; H04W 28/24; H04W 4/40; H04W 4/42–46;
(Continued)

(56) References Cited

U.S. PATENT DOCUMENTS

2014/0160990 A1 6/2014 Sachdev et al.
2017/0006494 A1* 1/2017 Wang .................... H04W 48/10
(Continued)

FOREIGN PATENT DOCUMENTS

CN 104754669 A 7/2015
JP 2021514332 A 6/2021
(Continued)

OTHER PUBLICATIONS

"LS to 3GPP on QoS Prediction," 3GPP TSG SA Meeting #SP-80, La Jolla, California, USA, SP-180252, Total 3 pages, 3rd Generation Partnership Project, Valbonne, France (Jun. 13-15, 2018).
(Continued)

*Primary Examiner* — Warner Wong
(74) *Attorney, Agent, or Firm* — Leydig, Voit & Mayer, Ltd.

(57) ABSTRACT

The present disclosure relates to providing a quality of service (QoS) function for communication services in communication networks. The disclosure presents a device for providing a QoS function, for a communication service of an application entity in a communication network comprising a plurality of network entities. The device is configured to transmit a monitoring request to one or more of: the application entity, a network entity, and a user equipment (UE), obtain a monitoring response from one or more of: the application entity, the network entity, and the UE, determine a change in QoS of the communication service of the application entity, based on the obtained monitoring response, and transmit the determined change in the QoS to the application entity and/or at least one of the network entities in the communication network.

22 Claims, 13 Drawing Sheets

(51) Int. Cl.
H04W 28/02 (2009.01)
H04L 43/06 (2022.01)
H04L 43/08 (2022.01)
H04W 4/40 (2018.01)

(52) U.S. Cl.
CPC .............. H04L 43/06 (2013.01); H04L 43/08 (2013.01); H04W 4/40 (2018.02)

(58) Field of Classification Search
CPC . H04W 24/00; H04W 24/10; H04W 28/0268; H04W 28/0967; H04W 52/0225; H04W 52/0251; H04L 41/50; H04L 41/5003; H04L 43/00; H04L 43/04; H04L 43/06; H04L 43/08; H04L 63/1468
See application file for complete search history.

(56) References Cited

U.S. PATENT DOCUMENTS

2021/0153048 A1* 5/2021 Velev ................ H04W 28/0268
2021/0153070 A1* 5/2021 Velev ................ H04W 28/0268
2021/0160890 A1* 5/2021 Selvanesan ........... H04W 24/10

FOREIGN PATENT DOCUMENTS

WO WO-2015172079 A1 * 11/2015 ........... H04L 41/069
WO 2018066876 A1 4/2018

OTHER PUBLICATIONS

"LS on Requirements to enable Predictive QoS for Automotive industry," 3GPP TSG SA WG2 Meeting #S2-128BIS, Sophia Antipolis, France, S2-188359, Total 10 pages, 3rd Generation Partnership Project, Valbonne, France (Aug. 20-24, 2018).
"Consideration of 5GAA NESQO aspects," 3GPP TSG SA WG2 Meeting #128bis, Sophia Antipolis, S2-188357, pp. 1-4, 3rd Generation Partnership Project, Valbonne, France (Aug. 20-24, 2018).
ZTE Corporation et al., "Different QoS prediction for different V2X users," 3GPP TSG-SA WG1 Meeting #83, West Palm Beach, Florida, USA, S1-182644 (revision of S1-182049), total 4 pages, 3rd Generation Partnership Project, Valbonne, France (Aug. 20-24, 2018).
ZTE Corporation et al., "Different QoS estimation for different V2X applications," 3GPP TSG-SA WG1 Meeting #83 , West Palm Beach, Florida, USA, S1-182735, total 3 pages, 3rd Generation Partnership Project, Valbonne, France (Aug. 20-24, 2018).
LG Electronics, "23.502: UE or SMF requested QoS modification," SA WG2 Meeting #118-BIS, Spokane, WA, USA, S2-170242, total 5 pages, 3rd Generation Partnership Project, Valbonne, France (Jan. 16-20, 2017).
"3rd Generation Partnership Project; Technical Specification Group Services and System Aspects; Enhancement of 3GPP support for V2X scenarios; Stage 1 (Release 15)," 3GPP TS 22.186 V15.3.0, total 16 pages, 3rd Generation Partnership Project, Valbonne, France (Jun. 2018).
"3rd Generation Partnership Project; Technical Specification Group Radio Access Network; Study on New Radio Access Technology; Radio Interface Protocol Aspects (Release 14)," 3GPP TR 38.804 V14.0.0, total 57 pages, 3rd Generation Partnership Project, Valbonne, France (Mar. 2017).
"3rd Generation Partnership Project; Technical Specification Group Services and System Aspects; Architecture enhancements for 5G System (5GS) to support Vehicle-to-Everything (V2X) services (Release 16)," 3GPP TS 23.287 V16.3.0, total 57 pages, 3rd Generation Partnership Project, Valbonne, France (Jul. 2020).
Huawei, HiSilicon, "Solution for KI#3: Enhancements for QoS Monitoring and Control," SA WG2 Meeting #126, S2-181951, Montreal, Canada, total 4 pages, 3rd Generation Partnership Project, Valbonne, France (Feb. 26-Mar. 2, 2018).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.2.2, total 791 pages, 3rd Generation Partnership Project, Valbonne, France (Jun. 2018).
"3rd Generation Partnership Project; Technical Specification Group Services and System Aspects; Architecture enhancements for 5G System (5GS) to support network data analytics services (Release 16)," 3GPP TS 23.288 V16.0.0, total 52 pages, 3rd Generation Partnership Project, Valbonne, France (Jun. 2019).
Huawei, Hisilicon, "Proposal for Solution to KI#2—Monitoring network situation and QoS by V2X application," 3GPP TSG-SA WG6 Meeting #22, Sophia Antipolis, France, S6-180416, total 4 pages, 3rd Generation Partnership Project, Valbonne, France (Mar. 5-9, 2018).
"3rd Generation Partnership Project; Technical Specification Group Core Network and Terminals; Non-Access-Stratum (NAS) protocol for Evolved Packet System (EPS); Stage 3 (Release 15)," 3GPP TS 24.301 V15.3.0, total 528 pages, 3rd Generation Partnership Project, Valbonne, France (Jun. 2018).
"3rd Generation Partnership Project; Technical Specification Group Services and System Aspects; Study on encrypted traffic detection and verification (Release 16)," 3GPP TR 23.787 V0.4.0, total 46 pages, 3rd Generation Partnership Project, Valbonne, France (Jun. 2018).
Huawei, "Predictable QoS and End-to-end Network Slicing for Automotive Use Cases," 5GAA WG2 Meeting, Munich, Germany, 5GAA Work Item Description, A-180057, XP051448233, total 4 pages (Feb. 5-8, 2018).
"3rd Generation Partnership Project; Technical Specification Group Services and System Aspects; Architecture enhancements for V2X services (Release 14)," 3GPP TS 23.285 V14.8.0, total 36 pages, 3rd Generation Partnership Project, Valbonne, France (Mar. 2019).
"3rd Generation Partnership Project; Technical Specification Group Services and System Aspects; Study on Machine-Type Communications (MTC) and other mobile data applications communications enhancements (Release 12)," 3GPP TR 23.887 V12.0.0, total 151 pages, 3rd Generation Partnership Project, Valbonne, France (Dec. 2013).
Huawei, HiSilicon, "Procedures for the provision of Network-controlled QoS for PC5 communication," SA WG2 Meeting #128bis, Sophia Antipolis, France S2-188309, XP051502955, total 4 pages, 3rd Generation Partnership Project, Valbonne, France (Aug. 20-24, 2018).
"3rd Generation Partnership Project; Technical Specification Group Services and System Aspects; Group Communication System Enablers for LTE (GCSE_LTE); Stage 2 (Release 15)," 3GPP TS 23.468 V15.0.0, total 32 pages, 3rd Generation Partnership Project, Valbonne, France (Dec. 2017).
"3rd Generation Partnership Project; Technical Specification Group Services and System Aspects; System improvements for Machine-Type Communications (MTC) (Release 11)," 3GPP TR 23.888 V11.0.0, total 165 pages, 3rd Generation Partnership Project, Valbonne, France (Sep. 2012).
"3rd Generation Partnership Project; Technical Specification Group Services and System Aspects; Study on application layer support for V2X services (Release 16)," 3GPP TR 23.795 V2.0.0, total 77 pages, 3rd Generation Partnership Project, Valbonne, France (Sep. 2018).
Huawei, HiSilicon, "New Key Issue and Solution for Dynamic Application Adjustment.," SA WG2 Meeting #128, Vilnius, Lithuania, S2-186843, total 3 pages, 3rd Generation Partnership Project, Valbonne, France (Jul. 2-6, 2018).
"3rd Generation Partnership Project; Technical Specification Group Services and System Aspects; Multimedia Broadcast/Multicast Service (MBMS); Protocols and codecs (Release 16)," 3GPP TS 26.346 V16.2.0, total 258 pages, 3rd Generation Partnership Project, Valbonne, France (Jun. 2019).
"3rd Generation Partnership Project; Technical Specification Group Services and System Aspects; System Architecture for the 5G System, Stage 2 (Release 15)," 3GPP TS 23.501 V15.2.0, total 217 pages, 3rd Generation Partnership Project, Valbonne, France (Jun. 2018).

(56) References Cited

OTHER PUBLICATIONS

"3rd Generation Partnership Project; Technical Specification Group Services and System Aspects; Policy and Charging Control Framework for the 5G System; Stage 2 (Relese 15)," 3GPP TS 23.503 V15.2.0, total 67 pages, 3rd Generation Partnership Project, Valbonne, France (Jun. 2018).

"3rd Generation Partnership Project; Technical Specification Group Services and System Aspects; Telecommunication management; Management and orchestration; Concepts, use cases and requirements," 3GPP TS 28.530 V2.0.0, total 31 pages, 3rd Generation Partnership Project, Valbonne, France (Sep. 2018).

"3rd Generation Partnership Project; Technical Specification Group Core Network and Terminals; User Equipment (UE) to V2X control function; protocol aspects; Stage 3 (Release 15)," 3GPP TS 24.386 V15.0.0, total 35 pages, 3rd Generation Partnership Project, Valbone, France (Jun. 2018).

"3rd Generation Partnership Project; Technical Specification Group Services and System Aspects; Study on architecture enhancements for EPS and 5G System to support advanced V2X services (Release 16)," 3GPP TR 23.786 V0.8.0, total 78 pages, 3rd Generation Partnership Project, Valbone, France (Aug. 2018).

JP/2023-026843, Office Action, dated Jan. 9, 2024.

Huawei et al., "Proposal for evaluation of solution#7," 3GPP TSG-SA WG6 Meeting #24, Osaka, Japan, S6-180843, Total 4 pages, 3rd Generation Partnership Project, Valbonne, France (May 21-25, 2018).

\* cited by examiner

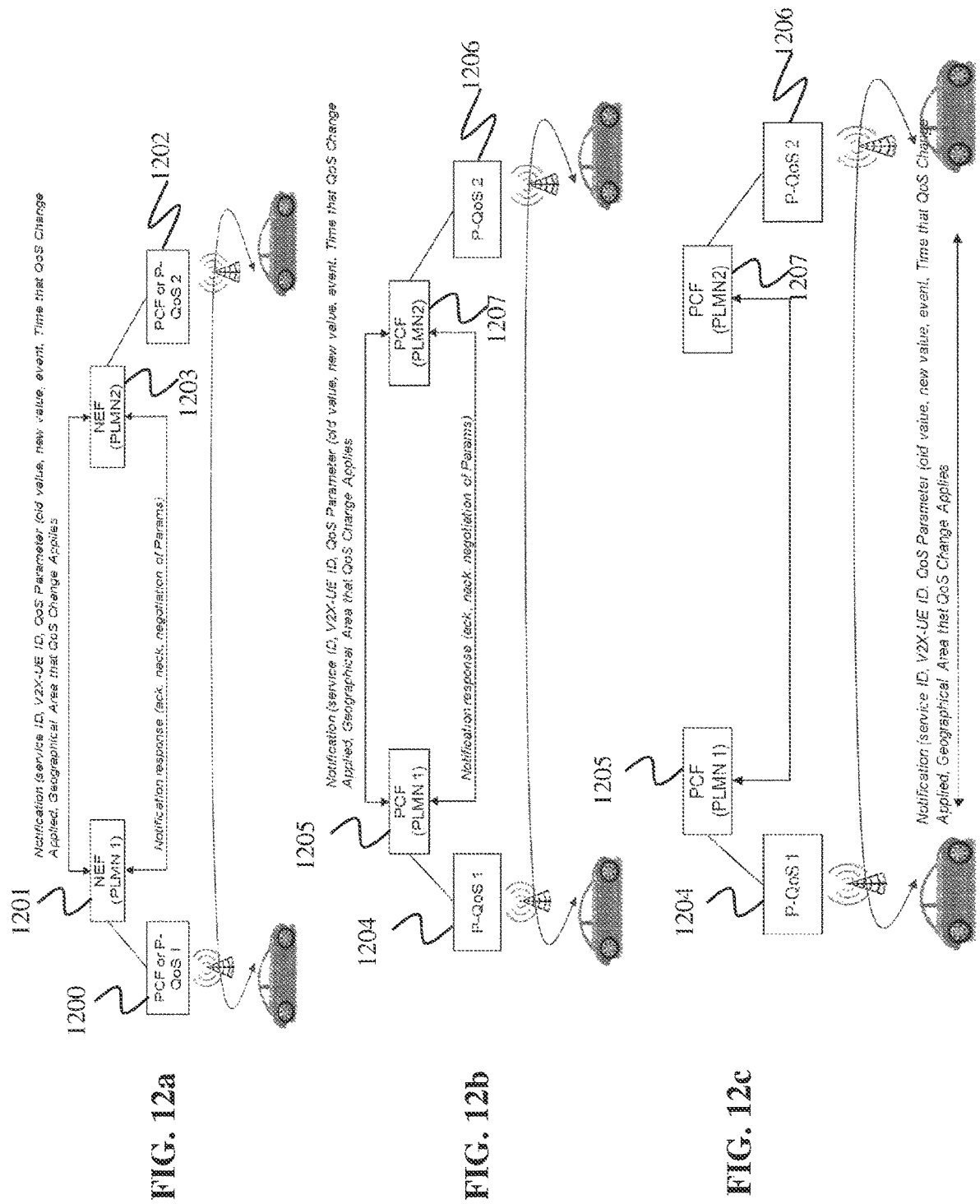

DEVICE AND METHOD FOR PROVIDING A QUALITY OF SERVICE FUNCTION

CROSS-REFERENCE TO RELATED APPLICATIONS

This application is a continuation of International Application No. PCT/EP2018/075035, filed on Sep. 17, 2018, the disclosure of which is hereby incorporated by reference in its entirety.

TECHNICAL FIELD

The present disclosure generally relates to the field of providing Quality of Service (QoS) in communication networks. More specifically, the present disclosure relates to a device and a method for determining a QoS of a communication service (e.g., a Vehicle-to-Everything (V2X) service) of an application entity (e.g., a vehicle, an application server) in a communication network including a plurality of network entities. This disclosure also relates to devices and methods that transmit the determined QoS (e.g., an expected change in the QoS) to the application entity and/or the network entities.

BACKGROUND

Conventional Enhanced Vehicular-to-Everything (eV2X) services are described as a special type of Fifth Generation (5G) services, which include both safety and non-safety services, according to the technical specification document with the reference number of "TS 22.186".

Some key requirements for eV2X services can be summarized as:
  The critical latency in the range of 3-10 ms, and the reliability of more than 99.999% Key Performance Indicators (KPIs), which may need to be adapted on demand, for example, due to new application requests (e.g., level of automation change, dynamic group-User Equipment (UE) formations) or network changes (i.e., network congestion to core network and/or access network entities, mode of transmission or operation change). Under these changes, the key challenge is to ensure the service continuity for V2X communications without any temporary loss of service or loss of packets.
  The dynamicity of environment (e.g., high mobility, frequent handovers, channel conditions, interference, etc.) may eventually lead to fluctuation of performance (Quality of Service (QoS) or Quality of Experience (QoE)) in short-time scale (e.g. in milliseconds). In non-critical services, this may be tolerated by averaging performance over a time window, however, in V2X critical communications, dynamic QoS changes need to be captured, otherwise this may lead to failure of meeting the network requirements (from application point of view this may be translated to possibility of car accidents due to the heavy reliance on cellular communication system).
  Processing complexity and signalling load, for dynamic monitoring and control of the UE (or UEs) QoS, across all segments of the communication system is expected to be high, assuming dense networks of connected cars.
  Group-based communications with a mixture of diverse KPIs need to be set or adapted. This needs to take into account the KPI/QoS of other cars in proximity to ensure traffic efficiency or safety.

Considering the above requirements for the eV2X services, a predictive QoS configuration or adaptation is essential, for example, to ensure meeting the mixture of safety or non-safety V2X services with the minimum control-plane latency, and real-time signalling.

Conventionally, the Radio Access Network (RAN) for each User Equipment (UE) establishes one or more Data Radio Bearers (DRBs) per Protocol Data Unit (PDU) session. The RAN associates the uplink traffic (UL) and downlink traffic (DL) QoS flows with the DRBs. The DRB defines the packet treatment on the radio interface (Uu). A DRB serves packets with the same packet forwarding treatment. Separate DRBs may be established for the QoS flows requiring different packet forwarding treatment, as it is defined in "3GPP-38804". The appropriate DRBs are established based on the output of the admission control, in order to make sure that the expected QoS is achieved. Moreover, the network via the "modify bearer context request" message provides the dynamic QoS modification in an established bearer, a detailed description can be found in 3GPP specification documents with the references of 3GPP-36331, and 3GPP-24301. This is a hard decision that does not provide an "early" notification scheme from the network to the UE (or a group of them), for example, about the expected QoS and/or the coverage changes. This function does not allow the application or the UE to be notified early enough about an expected QoS change, and negotiate with the network or adapt the application layer configuration, e.g., before the actual QoS modification.

Furthermore, the conventional schemes (e.g., Long Term Evolution (LTE), Fifth Generation (5G)) do not provide any prediction of the values of the QoS parameters at a specific time and/or a specific location, and consequently, they do not provide any subscription mechanism to enable the predictions or the fast notifications to the application entities.

Additional problems of the conventional devices and methods are as follow:
  It is not determined yet, how to establish the procedures for the configuration and the activation of the prediction of the QoS function, and what would be the impact on the current 5G architecture.
  Prediction of the QoS (P-QoS) changes require different monitoring of the network and the QoS, for example, based on the granularity or accuracy of the prediction and the requirements for the V2X services. Furthermore, it is not determined yet which monitoring is needed, e.g., by which entity, and with what level of abstraction for different V2X services, assuming different possible placements or distributed P-QoS elements.
  The functionality for the prediction of the QoS changes may also affect the management plane (MP) and the MP-to-CP interfaces (e.g. SBI). For example, the role of the MP to the P-QoS pre-operation (i.e., how the management of the NEs needs to be extended to support the P-QOS Network Function (NF)) and the operation or the maintenance phase, needs to be determined.

In addition, the conventional devices and methods have the disadvantages that, they do not support the prediction of the changes in the QoS and/or the coverage (e.g., based on the mobility information of the UEs (e.g., the vehicles), the application behaviour, the map information, and the network information).

Moreover, the conventional devices and methods do not support, for example, the subscription to the service for the prediction of the QoS Changes, the corresponding monitoring requests to enable the prediction, the QoS negotiation between the application and the network (e.g., V2X application at the vehicle side), the early notification of the involved applications for the changes of the provided QoS and/or the coverage, etc.

The discussed features and functions are required by specific future 5G services e.g., V2X safety and efficiency, and are not supported by the conventional devices and methods.

SUMMARY

In view of the above-mentioned problems and disadvantages, an objective of the present disclosure is to improve the conventional solutions for providing the QoS function for the communication services in the communication networks.

The objective of the present disclosure is achieved by the solution provided in the enclosed independent claims. Advantageous implementations of the present disclosure are further defined in the dependent claims.

In particular, the present disclosure proposes a device for providing a QoS function for a communication service of an application entity in a communication network. Specifically, the device may determine the QoS and/or a change in the QoS of the communication service of the application entity.

In some embodiments, the QoS function (also hereinafter referred to as the prediction QoS "P-QoS" function) may be based on a prediction functionality in a communication system that allows to, for example, determine the QoS, predict the QoS, determine a change in the QoS, predict (and/or detect very fast) changes in the QoS, and/or the coverage for a specific communication service of an application entity (e.g., V2X application entity), identify potential changes of the QoS (e.g., based on historic information or statistics). In the following the terms "QoS function" and "P-QoS function" are used interchangeably.

The QoS function (e.g., the P-QoS function) may be an individual network function, it may be distributed among different network entities, it may be a part of an existing function or network entity (e.g., Point Coordinates Function (PCF), Session Management Function (SMF), Network and Data Analytic Function (NWDAF), V2X control function, Application Function (AF) of a fifth generation (5G) communication system), etc., without limiting the present disclosure to a specific function. For example, the QoS function may be or may include determining expected QoS stability or change for a Protocol Data Unit (PDU) session (e.g., determining QoS fluctuations with respect to the traffic distribution), determining the expected coverage changes, group-based QoS expectation, estimated network situation (e.g., abstracted channel conditions, network availability, congestion status, load status, etc.), determining average interference levels in certain areas, determining average single or group-based mobility, determining handover failure rate probabilities, etc.

For instance, the QoS function (e.g., the P-QoS function) may provide notifications for type of communication, e.g., sidelink (PC5) communication, cellular (Uu) communication, combination of both communications, a dual connectivity modes, etc. Moreover, the QoS function may be adapted on either at the RAN side and/or at the end-to-end communication path that has been formed (e.g., core and RAN side).

The main advantages thereby can be summarized as:
Increasing the reliability and the availability of the provided communication services.
Reducing the impact of changes in the QoS of the communication services, and particularly for the critical services in the communication network.
Increasing the flexibility of the communication networks and the V2X services, or the V2X applications.
Maintaining and/or guaranteeing the expected QoS link quality (i.e., predictable or guaranteed delay, reliability, and throughput) to V2X applications, which is the essential requirement for safety related V2X communications.
Providing continuous service by the 5G communication system, and reducing the service drop rate, etc.

A first aspect of the present disclosure provides a device for providing a quality of service (QoS) function, for at least one communication service of at least one application entity in a communication network comprising a plurality of network entities, the device being configured to transmit a monitoring request to one or more of: the at least one application entity, at least one network entity, and at least one user equipment, obtain a monitoring response from one or more of: the at least one application entity, the at least one network entity, and the at least one user equipment, determine a change in QoS of the at least one communication service of the at least one application entity, based on the obtained monitoring response, and transmit information based on the determined change in the QoS to the at least one application entity and/or at least one of the network entities in the communication network.

For example, the device may provide the QoS function (e.g., enable the determination, the prediction, the notification and the negotiation of end-to-end QoS and/or the coverage levels change) in a communication system that supports different types of communication services and different types of communication links (Uu, PC5).

In some embodiments, a V2X application entity may be configured to subscribe and may further request the device (and/or the communication network) to provide the QoS function (e.g., enable the prediction service, determine the QoS, determine a change in the QoS, determine the change in the coverage levels, etc.). Moreover, the plurality of network entities (e.g., the RAN, the core network), UEs and the application entities may be configured to report information (e.g., application layer, network layer, radio layer, etc.) to the device and/or to the QoS function of the device. Moreover, the device may be located in the communication network (e.g., as an individual entity or as a part of another core network function) and may further be configured to provide the QoS function, prediction of the QoS changes and the coverage, etc. Furthermore, based on the outcomes of the QoS function, the device and/or the communication network may notify the V2X application entity about the expected changes in an initially agreed QoS and/or the changes in the coverage level. For example, the device (e.g., its QoS function) may provide another proposal for the QoS (i.e. when another QoS level is available), etc. The notification may include a location information, timing information, and probabilistic information to describe the change in the QoS and/or the coverage provision.

For example, a negotiation between the V2X application entity and the communication network may take place for an agreement on the appropriate QoS. The notification for the QoS change may be reported to the application entity and/or to at least one of the network entities (RAN, core network) to allow a re-configuration for maintenance of the QoS.

In some embodiments, the communication networks of two different Mobile Network operators (MNOs) or PLMNs may interact to configure the QoS function (e.g., the prediction service) for a UE (or a group of them) that roams from the first MNO to the second MNO. Moreover, two or more MNOs may exchange notifications and/or configurations for QoS changes, for example, in the embodiments that UEs participating to the same service are attached to different MNOs, and the prediction service is enabled. The Network Management Plane (NMS) of an MNO may further configure the prediction service for the QoS and/or the coverage levels change that an MNO can support.

In an implementation form of the first aspect, the device is further configured to activate, in response to a subscription request of the at least one application entity, a subscription of the at least one application entity to the QoS function, for determining the change in the QoS of the at least one communication service of the at least one application entity.

This is beneficial, since different application entities (which may be in the communication network or may enter the communication network) may request the subscription to the QoS function of the device. Moreover, the subscription of the different application entities may be activated.

The device and/or the communication network may selectively activate, and consequently may control, the subscription of the different application entities to the QoS function.

In a further implementation form of the first aspect, the device is further configured to notify the determined change in the QoS to the at least one application entity and/or the at least one of the network entities, by providing an additional QoS indicating the determined change in the QoS. This can be done by transmitting information based on the determined change in the QoS, in particular the change in the QoS as such.

This is beneficial, since specific future 5G services e.g., the V2X safety may require an early notification of the changes in the QoS and/or the coverage to the involved application entities. The device may determine the QoS, determine the changes in the QoS, and it may further provide, for example, an additional notification in which the determined changes in the QoS are indicated, and the application entity and/or the network entities may be notified.

In a further implementation form of the first aspect, the subscription of the at least one application entity to the QoS function, is activated based on a subscription parameter provided from the at least one application entity to the communication network.

This is beneficial, since the application entity may provide a subscription parameter and the device, e.g., its QoS function and/or the communication network may activate the subscription of the application entity to the QoS function.

In a further implementation form of the first aspect, the subscription parameter includes one or more of: a protocol data unit (PDU) session identification number (ID), a vehicle-to-everything (V2X) communication service ID, a single or a group of affected vehicle-to-everything user equipment (V2X-UE) IDs, a timing window and/or a frequency of the subscription request to the QoS function, a time horizon for the determination of the change in the QoS of the at least one communication service, a predefined geographical area for the determination of the change in the QoS of the at least one communication service, a threshold value of the change in the QoS of the at least one communication service, a duration time of the communication service, a segment-based subscription or an end to end (E2E), subscription to the QoS function, a required capability and a monitoring exposure to the at least one application entity, a required QoS for the communication service, at least one or more alternative QoS levels that could be used, when it is determined that a primary QoS is not available, and the type of the link including the sidelink (PC5), and/or the cellular communication (Uu).

This is beneficial, since different subscription parameters are provided from the application entity to the device and/or the communication network. Moreover, the subscription of the application entity to the QoS function may be activated.

In a further implementation form of the first aspect, the transmitted monitoring request includes one or more of: a monitoring parameter, a monitoring level, a duration time and granularity of the monitoring response, and a location information of the monitoring request.

This is beneficial, since providing the QoS function (e.g., determining the QoS) may require different monitoring of the communication network and/or the QoS. For example, a monitoring based on the granularity/accuracy of the prediction and the V2X services.

In a further implementation form of the first aspect, the change in the QoS of the at least one communication service is determined based on one or more of: a mobility information of the at least one application entity, a behavior of the at least one application entity, a map information, a historic information representing a combination of the location of the UE and/or the communication network and/or a radio information, and the communication network's characteristics.

This is beneficial, since different parameters such as the map information, the location information, the behavior of the application entity may change the QoS. Moreover, the changes in the QoS may be determined and the notification may be provided.

In a further implementation form of the first aspect, notifying the determined change in the QoS comprises providing a notification to the at least one application entity and/or the at least one of the network entities, based on a type of the communication service, including at least one of a Sidelink (PC5) communication, and a cellular communication (Uu).

This is beneficial, since the QoS function may provide notifications which may be based on the type of communication, e.g., the sidelink (PC5), the cellular (Uu), combination of both, a dual connectivity modes, etc. Moreover, the determined QoS and/or the determined change in the QoS may be provided.

In a further implementation form of the first aspect, notifying the determined change in the QoS comprises providing a notification to the at least one application entity and/or the at least one of the network entities, including one or more of: the protocol data unit (PDU) session identification number (ID), the vehicle-to-everything (V2X) communication service ID, the type of the link including the Sidelink (PC5) and/or the Cellular communication (Uu), the single or the group of the affected vehicle-to-everything user equipment (V2X-UE) IDs, a QoS parameter, a proposal for a new level of the QoS, a timing information of the change in the QoS, a location information of the change in the QoS, a level of the QoS per user equipment (UE), a timing information of the UE, and a probabilistic information for the change in the QoS.

This is beneficial, since the determined change in the QoS may be provided.

In a further implementation form of the first aspect, the at least one communication service includes a vehicle-to-everything (V2X) communication service.

This is beneficial, since the communication service may be the V2X communication service. For example, the vehicle may need to communicate with another network entity that may affect the vehicle. Moreover, the QoS of the V2X service may be determined, etc.

In a further implementation form of the first aspect, the application entity is based on a V2X application entity.

For example, the application entity may be a vehicle or a mobile device, etc.

In a further implementation form of the first aspect, the V2X application entity includes one or more of: an application server for the V2X communication service, a V2X application client being representative of a UE, an application function (AF) being representative of a public land mobile network, PLMN-owned application function, and a middleware application entity located between the application server and the communication network.

The present disclosure is not limited to a specific type of application entity. Different types of the application entities, e.g., the V2X application entity, the application server, the AF, etc., may have different types of the communication services, and may further request a subscription to the QoS function. Moreover, the QoS function for the communication services of the different types of the application entities may be provided.

In a further implementation form of the first aspect, the application server for the V2X communication service includes one or more of: a V2X application server (V2X AS), a group-communications system application server (GCS-AS), and a content provider.

In a further implementation form of the first aspect, the device is further configured to determine the change in the QoS of the at least one communication service, based on a slice based architecture.

This is beneficial, since the appropriate amount of network resources to a specific slice may be allocated.

In a further implementation form of the first aspect, the communication service is based on a direct vehicle-to-vehicle (V2V), communication service, and the application entity is based on a UE.

For example, the application entity may be a UE such as a vehicle, furthermore, the vehicle may further communicate with another vehicle.

In a further implementation form of the first aspect, the device is further configured to provide a vehicle-to-everything control function (V2XCF) for providing a sidelink (PC5), parameter to the UE.

This is beneficial, since a sidelink (PC5) parameter may be provided to the UE.

In a further implementation form of the first aspect, the device is further configured to provide, via the vehicle-to-everything control function (V2XCF), a notification message to the UE, being representative of an enhanced provisioning policy for the QoS function.

For example, in some embodiments, a direct vehicle to vehicle communication may be provided.

In a further implementation form of the first aspect, the notification message provided to the UE includes one or more of: the sidelink (PC5) parameter, a mapping of proximity services (ProSE) per packet priorities quality of service (PPPP/QoS) class to packet delay budget (PDB) and packet error rate (PER) for a current QoS, and the predicted change in the QoS, a radio parameter for the current QoS, and the determined change in the QoS, a timer information (Txxxx) indicating the UE changing the radio parameters or mapping of the proximity services (ProSE) per packet priorities (PPPP) for the vehicle-to-everything (V2X) communication service over the sidelink (PC5).

This is beneficial, since the device may notify the UE, and the notification may be provided by the V2XCF.

In a further implementation form of the first aspect, the communication system is based on a 5G communication system.

Without limiting the present disclosure, in some embodiments, the communication system may be based on the 5G.

In a further implementation form of the first aspect, the device is further configured to trigger a network reconfiguration based on the determined change in the QoS, for maintaining a specific QoS level.

For example, the QoS function may be used to trigger a network reconfiguration, in order to maintain a specific QoS level.

In a further implementation form of the first aspect, the device is further configured to provide an alert notification to the at least one application entity and/or the at least one of the network entities, being indicative of an accuracy of the determined change in the QoS.

This is beneficial, since a rapid notification may be transmitted about a QoS change, e.g., when the prediction has a lower accuracy with respect to a predefined criterion.

In a further implementation form of the first aspect, the device is further configured to deactivate and/or modify the subscription of the at least one application entity to the QoS function.

This is beneficial, since, for example, the changes of the location may represent different levels of accuracy for the QoS function. Moreover, an existing subscription may be updated and/or modified.

A second aspect of the disclosure provide a method for providing a quality of service (QoS) function, for at least one communication service of at least one application entity in a communication network comprising a plurality of network entities, the method comprising transmitting a monitoring request to one or more of: the at least one application entity, at least one network entity, and at least one user equipment, obtaining a monitoring response from one or more of: the at least one application entity, the at least one network entity, and the at least one user equipment, determining a change in quality of service (QoS) of the at least one communication service of the at least one application entity, based on the obtained monitoring response, and transmitting the determined change in the QoS to the at least one application entity and/or at least one of the network entities in the communication network.

In an implementation form of the second aspect, the method further comprises activating, in response to a subscription request of the at least one application entity, a subscription of the at least one application entity to the QoS function, for determining the change in the QoS of the at least one communication service of the at least one application entity.

In a further implementation form of the second aspect, the method further comprises notifying the determined change in the QoS to the at least one application entity and/or the at least one of the network entities, by providing an additional QoS indicating the determined change in the QoS.

In a further implementation form of the second aspect, the subscription of the at least one application entity to the QoS function, is activated based on a subscription parameter provided from the at least one application entity to the communication network.

In a further implementation form of the second aspect, the subscription parameter includes one or more of: a protocol data unit (PDU) session identification number (ID) a vehicle-to-everything (V2X) communication service ID, a single or a group of affected vehicle-to-everything user equipment (V2X-UE) IDs, a timing window and/or a frequency of the subscription request to the QoS function, a time horizon for the determination of the change in the QoS of the at least one communication service, a predefined geographical area for the determination of the change in the QoS of the at least one communication service, a threshold value of the change in the QoS of the at least one communication service, a duration time of the communication service, a segment-based subscription or an end to end (E2E) subscription to the QoS function, a required capability and a monitoring exposure to the at least one application entity, a required QoS for the communication service, at least one or more alternative QoS levels that could be used, when it is determined that a primary QoS is not available, and the type of the link including the sidelink (PC5) and/or the cellular communication (Uu).

In a further implementation form of the second aspect, the transmitted monitoring request includes one or more of: a monitoring parameter, a monitoring level, a duration time and granularity of the monitoring response, and a location information of the monitoring request.

In a further implementation form of the second aspect, the change in the QoS of the at least one communication service is determined based on one or more of: a mobility information of the at least one application entity, a behavior of the at least one application entity, a map information, a historic information representing a combination of the location of the UE and/or the communication network and/or a radio information, and the communication network's characteristics.

In a further implementation form of the second aspect, the method further comprises providing a notification to the at least one application entity and/or the at least one of the network entities, based on a type of the communication service, including at least one of a Sidelink (PC5) communication, and a cellular communication (Uu).

In a further implementation form of the second aspect, the method further comprises providing a notification to the at least one application entity and/or the at least one of the network entities, including one or more of: the protocol data unit (PDU) session identification number (ID), the vehicle-to-everything (V2X) communication service ID, the type of the link including the Sidelink (PC5), and/or the Cellular communication (Uu), the single or the group of the affected vehicle-to-everything user equipment (V2X-UE), IDs, a QoS parameter, a proposal for a new level of the QoS, a timing information of the change in the QoS, a location information of the change in the QoS, a level of the QoS per user equipment (UE), a timing information of the UE, and a probabilistic information for the change in the QoS.

In a further implementation form of the second aspect, the at least one communication service includes a vehicle-to-everything (V2X) communication service.

In a further implementation form of the second aspect, the application entity is based on a V2X application entity.

In a further implementation form of the second aspect, the V2X application entity includes one or more of: an application server for the V2X communication service, a V2X application client being representative of a UE, an application function (AF) being representative of a public land mobile network, PLMN-owned application function, and a middleware application entity located between the application server and the communication network.

In a further implementation form of the second aspect, the application server for the V2X communication service includes one or more of: a V2X application server (V2X AS), a group-communications system application server (GCS-AS), and a content provider.

In a further implementation form of the second aspect, the method further comprises determining the change in the QoS of the at least one communication service, based on a slice based architecture.

In a further implementation form of the second aspect, the communication service is based on a direct vehicle-to-vehicle (V2V) communication service, and the application entity is based on a UE.

In a further implementation form of the second aspect, the method further comprises providing a vehicle-to-everything control function (V2XCF), for providing a sidelink (PC5) parameter to the UE.

In a further implementation form of the second aspect, the method further comprises providing, via the vehicle-to-everything control function (V2XCF), a notification message to the UE, being representative of an enhanced provisioning policy for the QoS function.

In a further implementation form of the second aspect, the notification message provided to the UE includes one or more of: the sidelink (PC5) parameter, a mapping of proximity services (ProSE) per packet priorities quality of service (PPPP/QoS) class to packet delay budget (PDB), and packet error rate (PER) for a current QoS, and the predicted change in the QoS, a radio parameter for the current QoS, and the determined change in the QoS, a timer information (Txxxx) indicating the UE changing the radio parameters or mapping of the proximity services (ProSE) per packet priorities (PPPP) for the vehicle-to-everything (V2X) communication service over the sidelink (PC5).

In a further implementation form of the second aspect, the communication system is based on a 5G communication system.

In a further implementation form of the second aspect, the method further comprises triggering a network reconfiguration based on the determined change in the QoS, for maintaining a specific QoS level.

In a further implementation form of the second aspect, the method further comprises providing an alert notification to the at least one application entity and/or the at least one of the network entities, being indicative of an accuracy of the determined change in the QoS.

In a further implementation form of the second aspect, the method further comprises deactivating and/or modifying the subscription of the at least one application entity to the QoS function.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which:

FIGS. 12a, 12b, and 12c schematically illustrate exemplary MSCs for providing QoS function in a Multi-MNO environment, where the application entities are attached at different MNOs.

DETAILED DESCRIPTION OF EMBODIMENTS

Figure 1:
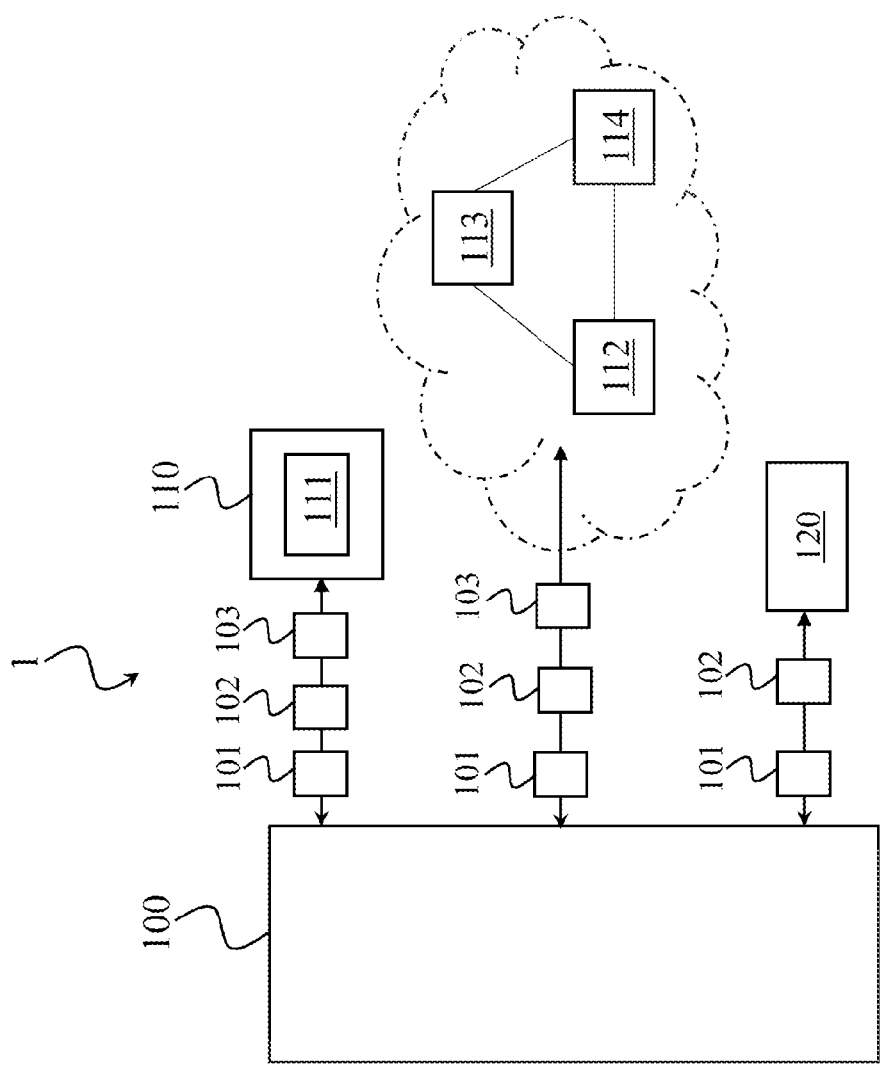
FIG. 1 shows a schematic view of a device for providing a quality of service (QoS) function, for a communication service of an application entity in a communication network, according to an embodiment of the disclosure.

FIG. 1 shows a device 100 for providing a quality of service (QoS) function, for a communication service 111 of an application entity 110 in a communication network 1, according to an embodiment of the disclosure.

The communication network may further include the user equipment 120, and a plurality of network entities 112, 113, and 114. In some embodiments, the device and/or the application entity and/or the network entities and/or the user equipment 120 may be configured to communicate to each other, may be located in one or more communication networks, may be located in one or more PLMNs, etc., without limiting the present disclosure to a specific network configuration. Moreover, the plurality of network entities 112, 113, and 114 may be based on Radio Access Network (RAN) nodes (e.g., Base Stations) or Core Network (CN) entities (e.g., NWDAF, SMF, PCF, UPF, Access and Mobility management Function (AMF), etc).

The device 100 is configured to transmit a monitoring request 101 to one or more of: the application entity 110, at least one network entity (e.g., 112 in FIG. 1), and the user equipment 120. For example, the monitoring request 101 may be transmitted to different network nodes, and may further be used for collection of information for determining the QoS of the communication service, the change in the QoS, etc.

Moreover, the monitoring requests 101 may be transmitted to the application entity 110 and/or the UE 120, for example, directly or via another network entity.

The device 100 is further configured to obtain a monitoring response 102 from one or more of: the application entity 110, the at least one network entity 112, and the user equipment 120.

As discussed, the device 100 may transmit the monitoring request 101 to the application entity 110 (e.g., which may be a vehicle). Moreover, the device 100 may further obtain the monitoring response 102 from the application entity 110 which may be, e.g., the path of the vehicle, the trajectory of the vehicle, etc.

In addition, the device 100 may transmit the monitoring request 101 to the UE 120 (e.g., a vehicle). Moreover, the device 100 may further obtain the monitoring response 102 from the UE 120 which may be, e.g., the path of the vehicle, the trajectory of the vehicle, etc.

The device 100 is further configured to determine a change in quality of service 103 of the at least one communication service 111 of the at least one application entity 110, based on the obtained monitoring response 102.

For example, the device may obtain the monitoring response from one or more of the network entities that the monitoring request is transmitted to them. Moreover, for example, the QoS of the communication service, a change in the QoS of the communication service, a change in the coverage, etc., may be determined.

The device 100 is further configured to transmit the determined change in the QoS 103 to the at least one application entity 110 and/or at least one of the network entities 112, 113, and 114 in the communication network 1.

For example, the device may determine the change in the QoS, and it may further transmit the change in the QoS (e.g., a QoS, a change in QoS, a coverage level, etc.) to the application entity and/or one more of the network entities, etc.

Figure 2:
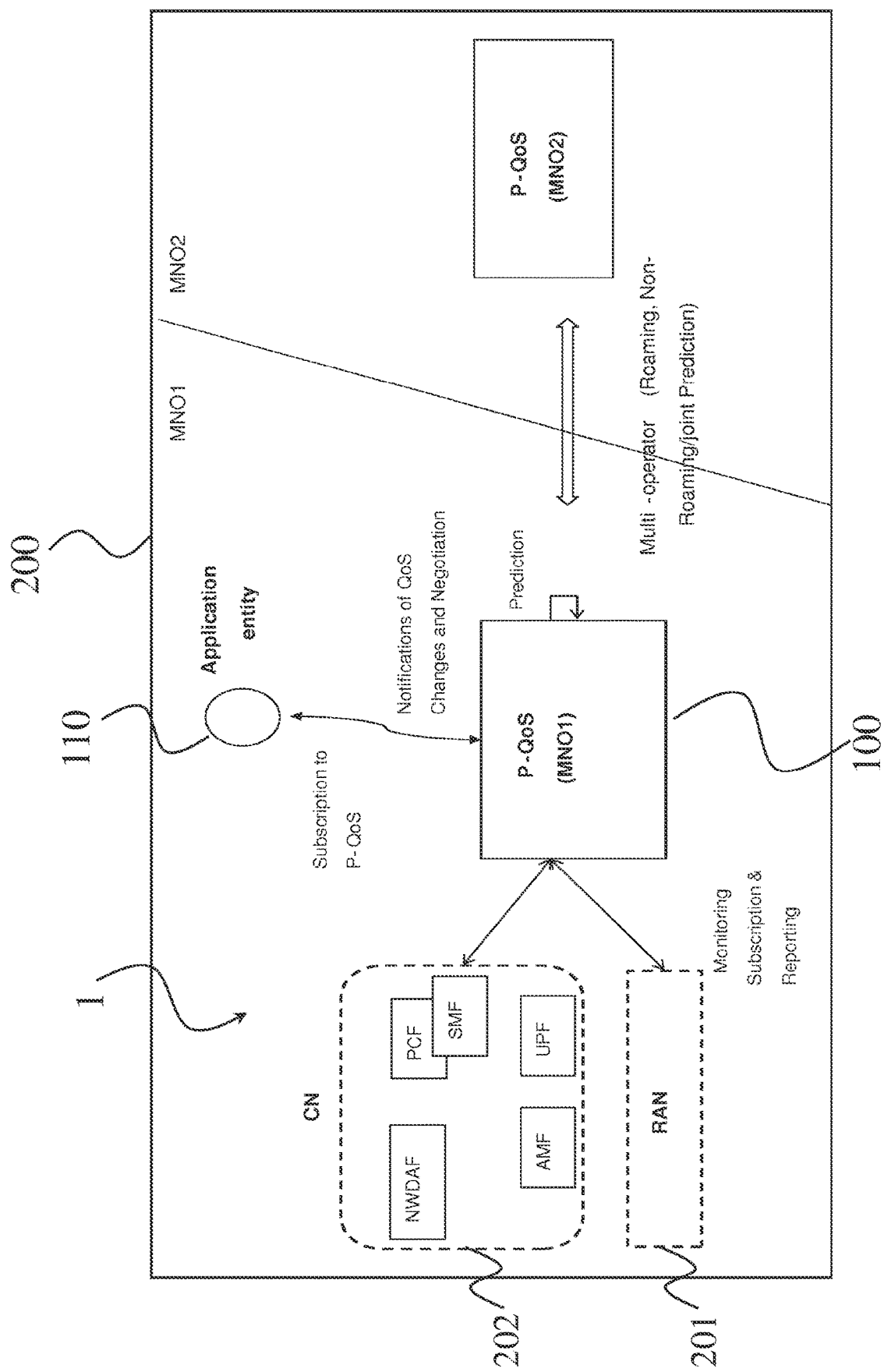
FIG. 2 shows a schematic view of a system including a device for activating and providing a quality of service function for a communication service of an application entity, according to an embodiment of the disclosure.

FIG. 2 shows a schematic view of a system 200 including a device 100 for activating and providing a quality of service (QoS) function for a communication service of an application entity 110, according to an embodiment of the disclosure.

The device 100 in the system 200 performs several procedures that may be needed, in order to enable the QoS function (e.g., the P-QoS functionality).

The system 200 includes the application entity 110 which sends a subscription request to the QoS function of the device 100.

The device 100 performs activation of prediction for all types of links and/or services, in response to the subscription request of the application entity 110. By activating the subscription request, for example, the QoS and/or the changes in the QoS of the communication service of the application entity may be determined.

The device 100 further performs activation of monitoring reports to the appropriate nodes for all types of links and/or services, in order to enable and/or to provide the QoS function. For example, the device 100 transmits the monitoring request to the RAN 201 and several network entities including NWDAF, SMF, PCF, Access and Mobility management Function (AMF) and UPF, in the CN 202 of the communication network 1. Furthermore, the device 100 obtains a monitoring response from the RAN 201, and from one or more of the network entities including NWDAF, SMF, PCF, AMF and UPF in the CN 202.

The device 100 further determines a change in the QoS of the communication service of the application entity 110, based on the obtained monitoring response, and transmits the determined change in the QoS to the application entity 110.

For example, the device 100 notifies the application entity, by providing a notification of QoS change and/or coverage using timing location, probabilistic information, etc.

The system 200 is based on a Multi-operators in which two different operators including a first mobile network operator MNO1 is interacting with a second mobile network operator MNO2. The interactions may be based on roaming and non-roaming cases. In the embodiment of FIG. 2, the device 100, the network entities in the CN 202, the application entity 110, and the RAN 201 are included in the first MNO1, without limiting the present disclosure to a specific location of the different entities.

The device 100 (and/or the system 200) further performs the configuration of the P-QoS, for example, by the Management plane.

In the following, several exemplary procedures for enabling and providing the QoS function (e.g., a network QoS prediction function) are described using, as an example, a 5G communication system, without limiting the present disclosure to a specific type of the communication systems.

Figure 3:
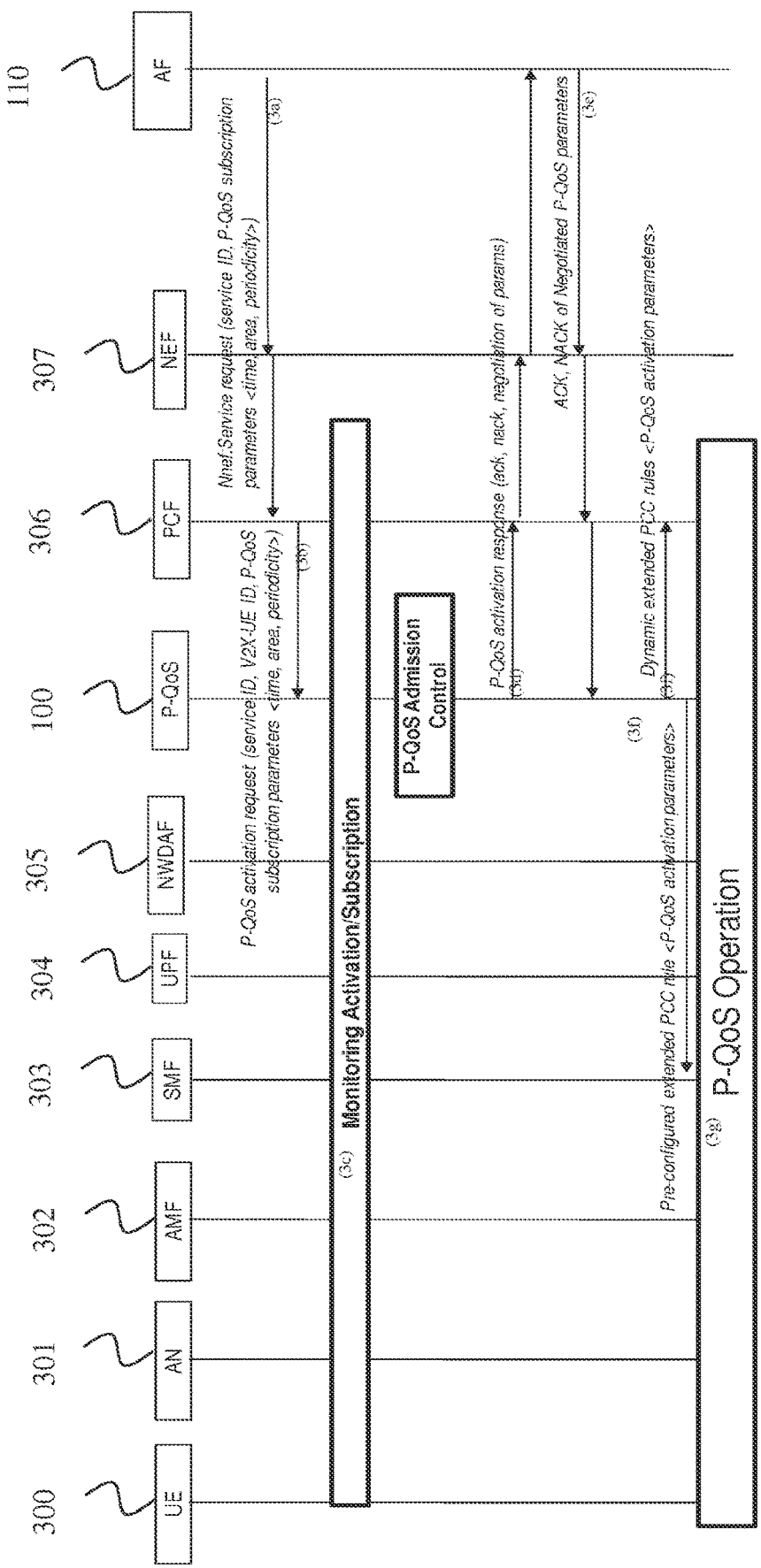
FIG. 3 shows a flow diagram of an exemplary procedure, for activation of the QoS function, configuration of the communication network, and providing the QoS function.

FIG. 3 shows a flow diagram of an exemplary procedure for activation of the QoS function, configuration of the communication network and providing a QoS function. Entities shown in FIG. 3 are the UE 300, the AN 301, the AMF 302, the SMF 303, the UPF 304, the NWDAF 305, the device 100 which is configured to provide the QoS function (e.g., the P-QoS functionality), the PCF 306, the Network Exposure function (the NEF) 307, and the application entity in the form of application function 110.

The UE 300 may be similar and/or may function similar to the UE 120 of the FIG. 1, without limiting the present disclosure. For example, the UE 120 of FIG. 1 and the UE 300 of FIG. 3, may be based on an identical vehicle or different types of vehicles, etc.

For providing the QoS function (e.g., P-QoS functionality), the V2X application entity subscribes with the 5G communication network to support the predictive QoS (P-QoS) functionality.

The application entity sends a P-QoS subscription parameter to the 5G system. The subscription parameter includes one or more of:

A protocol data unit (PDU) session identification number (ID).

A vehicle-to-everything (V2X) communication service ID.

A single or a group of affected vehicle-to-everything user equipment (V2X-UE) IDs.

A timing window and/or a frequency of the subscription request to the QoS function.

A time horizon for the determination of the change in the QoS of the communication service (e.g., a QoS guarantee that the communication network provides for the next x seconds, the QoS downgrade or the QoS upgrade will take place in x seconds, etc.).

A predefined geographical area for the determination of the change in the QoS of the communication service (e.g., the QoS downgrade/upgrade will take place in x meters or the location with coordinates of x, y, z, etc.).

A threshold value of the change in the QoS (e.g., thresholds for being notified) of the at least one communication service.

A duration time of the communication service.

A specific prediction capability (e.g., QoS Change, out of coverage, 5G to LTE transition, etc.).

A segment-based subscription or an end to end (E2E) subscription to the QoS function (this information may be required, for example, for identifying the requirement for a local or a global prediction).

A required capability and a monitoring exposure to the at least one application entity (this information may be used by the communication network to determine whether the subscription request can be activated or not).

A required QoS for the communication service.

At least one or more alternative QoS levels that could be used, when it is determined that a primary QoS is not available.

The type of the link including the Sidelink (PC5) and/or the Cellular communication (Uu).

In the embodiment of FIG. 3, the activation of the QoS function (e.g., the P-QoS functionality activation) is described as a feature which can be activated, e.g., in response to a subscription request of an application entity being based on an application function (AF), and for a V2X service considering the 5G system. Note that, the procedure can be applied more generally to all types of the application entities. For example, the application entity may be based on an application server, an application function, a middleware application, etc. Moreover, the communication system may also be any type of the (e.g., cellular) communication systems.

At step 3a, initially AF 110 sends a service request message which includes:

One or more V2X service IDs.

One or more of the subscription parameters.

For example, the AF 110 sends a service ID, and a time, area and periodicity information to the NEF 307 and the PCF 306, respectively.

Next, at step 3b, the PCF 306 (or any relevant network functionality which may be responsible for the policy control and charging), after receiving the AF's 110 request, sends a P-QoS activation request message to the device 100 (e.g., its P-QoS logical unit). The P-QoS activation request message includes:

One or more V2X service IDs.

One or more V2X UE IDs.

One or more of the P-QoS subscription parameters (e.g., parameters related to the time, geographic area, and the periodicity or monitoring requirement).

At step 3c, the device 100 (for example, its P-QoS unit) initiates the monitoring activation/subscription procedure (which will be described in detailed in the following in FIG. 4). The monitoring activation/subscription procedure may include on demand the analytics activation messages to the NWDAF 305, as well as, to the RAN via the AMF 302 and the UE 300 (for example, for a real-time UE monitoring).

Next, at step 3d, the device 100 (e.g., its P-QoS admission control), possibly together with the PCF 306, activates the subscription of the AF 110 to the QoS function, in order to ensure that the communication network can support this features and monitoring response is acknowledged (ACK).

As the result of the admission control, in step 3d, the P-QoS functionality of the device 100 sends a P-QoS activation response message to the application entity 110, directly, or via the NEF 307. This message may include an ACK (in case of acceptance) or NACK (in case of rejection) or a negotiation of network parameters, for example, in the cases that, not all P-QoS parameters can be fulfilled by the system, etc.).

At step 3e, the AF 110 responds by an ACK/NACK, for example, in the case of negotiating the P-QoS subscription parameters.

Moreover, at step 3f, since the Policy and Charging Rules (PCC) rules are sent by the Point coordinates function (PCF) 306 (either dynamically or by pre-configuring SMF 303 with rules), the device 100 (e.g., the P-QoS function) may undertake the role of overriding or extending the PCC rules by sending a message to the PCF 306 and/or to the SMF 303. For example, a pre-configured extended PCC rule message may be transmitted from the P-QoS of the device 100 to the SMF 303, and/or a dynamic extended PCC rules message may be transmitted from the P-QoS of the device 100 to the PCF 306. Moreover, both messages may include the P-QoS activation parameters. In some embodiments, depending on the location of the P-QoS function, e.g., at the PCF 306 or the SMF 303 or as a new function, etc., different interfaces may be impacted.

Next, at step 3g, after updating the PCC rules and the activation of monitoring on demand, the P-QoS function of the device 100 may be operated, for example, in a service or a session based manner.

The communication network may notify the application entity 110 when the prediction service is not supported any more (e.g., change of the Radio Access Technology (RAT) or the cell), or in the cases when any change in the configuration of the prediction service (i.e. the QoS function) is needed. Therefore, the prediction service may be, e.g., released, modified, and updated either by the application entity and/or by the device and/or by the communication network, etc.

Alternatively, the subscription request for the activating the prediction service may be sent by an application entity of a UE (or a group of UEs) to the network using control plane signaling (Radio Resource Control (RRC), Non-access stratum (NAS)), or to an application function (e.g., AF of 5GS) using user plane signaling.

Figure 4:
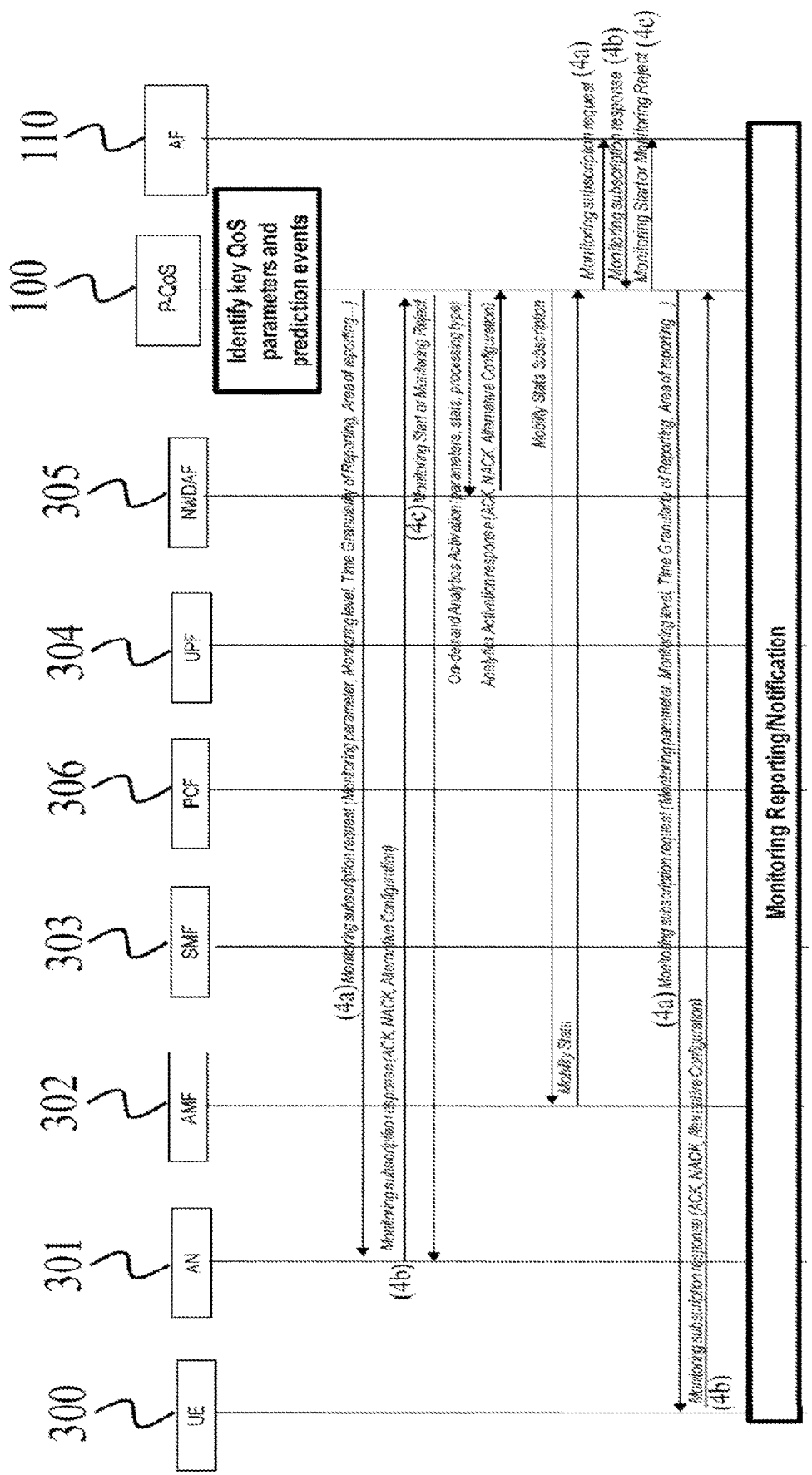
FIG. 4 shows a flow diagram of an exemplary procedure, for activation of monitoring for the QoS function.

FIG. 4 shows a flow diagram of an exemplary procedure, for activation of monitoring for the QoS function.

At step 4a, the device 100 (e.g., its P-QoS function) transmits a monitoring request to a network entity, for example, to AN 301 in the communication network, and/or the application entity 110, and/or the UE 300. According to the P-QoS subscription request (e.g., the P-QoS subscription parameters, the type of the V2X service), different monitoring subscription or configuration requests may be required, transmitted and collected, e.g., by different network nodes (e.g., gNB, UPF), depending on the type of the V2X service and the agreed P-QoS requirements. These requests may allow collection of different types of information that may be needed, in order to, e.g., activate the subscription request, determine the QoS, determine the change in the QoS and/or enable the prediction of the QoS change, etc.

The different types of information may be one or more of:
General information per node (BS, UPF) or per link (e.g., N3 in 5G) that can be retrieved via the NWDAF or directly via the corresponding network node (e.g., average cell load, average bit rate, reliability, load, coverage information).
Specific information per QoS flow that can be retrieved via the corresponding node (RAN, CN, UE), e.g., packet delay information.
Analytics or historic data e.g., statistics on handover failure rate, rejected PDU sessions etc.
Specific information per UE (e.g., RRC measurement reports, radio link quality, UE speed, UE mobility information) that can be retrieved via same or other neighboring UEs.
Application layer information provided either by the application entity or a third party (e.g., vehicle planned route/path/trajectory, application behavior and/or configuration, road traffic information, road infrastructure information),
Events that can be reported by the corresponding node that monitors and detects the events (e.g., UE reachability, communication failure).

In addition, the procedure to identify the key QoS parameters and the prediction events, may be affected by, for example, the type of service, the type of the communication link that is used (e.g., cellular (Uu), sidelink (PC5)) and the configuration of the P-QoS subscription request.

The device (e.g., its P-QoS function) may transmit (e.g., directly or via another CN function) the appropriate monitoring subscription request messages to the appropriate nodes (e.g., UE, RAN node, CN node, V2X application entity).

The transmitted monitoring request may include one or more of:
The monitoring parameters: a parameter (e.g., latency, data rate, packet error rate, bit rate, reliability, jitter, Signal-to-Interference-Plus-Noise Ratio (SINR), coverage) and/or a measure type (e.g., average, actual value, etc.).
The monitoring level: the QoS flow, the link, the UE, and the network node.
The time granularity of the reporting: a one-time report, a periodic (value) report, a condition based report (e.g., having a value above/below a threshold value).
The area of reporting: specific cells, and the geographic location.

At step 4b, the node that has received the monitoring request for the prediction service, responds by an ACK or NACK. In the case if the NACK, the node may indicate an alternative monitoring configuration, if it is available.

At step 4c, after the successful subscription or activation of the monitoring phase, then the actual monitoring (collection of information) may be initiated, for example, a monitoring start message may be sent by the P-QoS function of the device 100 (e.g., directly or via another CN function). Moreover, the monitoring may be stopped or paused (e.g., with a monitoring reject message), and the monitoring configuration may be modified during the lifetime of the V2X service.

In addition, the device 100 and/or its P-QoS function may transmit an on-demand analytic activation request message. For example, the P-QoS function 100 may transmit the on-demand analytic activation request message to the NWDAF 305. Moreover, the NWDAF 305 may provide an analytic activation respond (e.g., ACK or NACk), to the P-QoS function of the device 100.

As discussed, the device 100 may transmit the monitoring request to the application entity (i.e. the AF 110 in FIG. 4). Moreover, the device 100 may further obtain the monitoring response from the AF 110 which may be, e.g., the path of the vehicle, the trajectory of the vehicle, etc.

In addition, the device 100 may transmit the monitoring request to the UE 300 which may be a vehicle. Moreover, the device 100 may further obtain the monitoring response from the UE 120 which may be, e.g., the path of the vehicle, the trajectory of the vehicle, etc.

Moreover, the device 100 and/or its P-QoS function may transmit a mobility stats subscription, for example, to the AMF 302, and the AMF 302 may further transmit a mobility stats response to the device 100.

Figure 5:
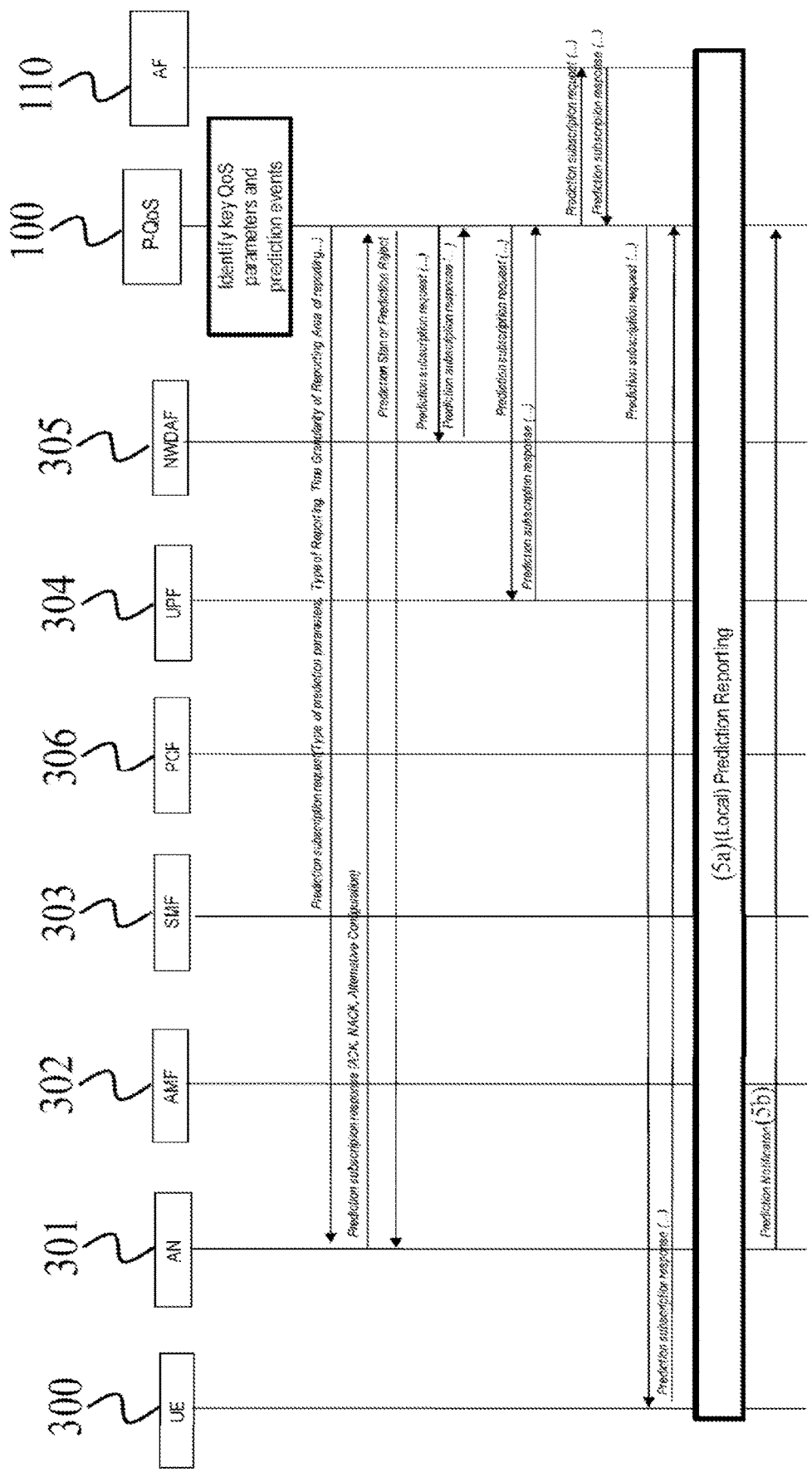
FIG. 5 shows a flow diagram of an exemplary procedure, for activation of monitoring for a local prediction of the QoS function.

FIG. 5 shows a flow diagram of an exemplary procedure, for activation of monitoring for a local prediction of the QoS function.

In some embodiments, the P-QoS function (or any other CN function) may be based on a "local" predictions of, e.g., the changes in the QoS, the events that may be requested by and/or allocated to the individual network entities (e.g., Base Station (BS), UPF) or the UE.

For instance, the assignment of the prediction of the changes in the QoS for a PC5/sidelink communication may be faster to take place at the RAN side. The node that has received the prediction subscription request message, may respond by ACK or NACK. Moreover, in the case of the NACK, the node may indicate an alternative prediction configuration, if possible.

At step 5*a*, the device 100 and/or its P-QoS function transmits a local prediction message to the application entity AF 110 and/or to a network entity.

At step 5*b*, the AN 301 transmit a prediction notification message (e.g., expected degradation of radio quality, increase of path loss of Uu and/or PC5 radio link) to the P-QoS function of the device 100.

The prediction subscription request message may include the type of the parameter that should be predicted by the recipient node (or a local P-QoS functionality), the type of reporting (e.g., per flow, node, session, etc.), the time granularity of the prediction and the reporting, the location of the prediction and the reporting, etc.

After the (successful) subscription or activation of the "local" prediction, then the actual "local" prediction results (collection of information) may be initiated, for example, a prediction start message is transmitted by the P-QoS function (directly or via another CN function). The "local" prediction may further be stopped or paused, while the "local" prediction configuration being modified during the lifetime of a V2X Service.

The "local" prediction results (i.e., the prediction notification message) may be sent to one or more of:

A central P-QoS entity for generating the "e2e" prediction outcome, for a service or a communication link.

The SMF in 5G networks (which is close to the existing 3GPP spirit).

Transmitting directly to a V2X application entity (e.g., to monitor or to predict the UL latency value for a specific service), when a quick notification is needed.

The determined change in the QoS may be transmitted to the application entity and/or one of the network entities. For example, the device 100 may provide a notification to the application entity 110 and/or one of the network entities, based on a type of the communication service, including at least one of a sidelink (PC5), communication, and a cellular communication (Uu). The outcome of the QoS function (e.g., the P-QoS functionality), regardless if it is based on a centralized P-QoS function or it is distributed among different network entities, may be transmitted to the V2X application entity (e.g., the UE, the application server, etc.) and/or one or more of the network entities.

Moreover, the type and the description of the notification may depend on the initial P-QoS subscription. For example, the notification may be:

The UE1 will be out of coverage in X seconds.

The UE1 will be out of coverage in the location with the coordinates of (x, y, z).

The QoS (e.g., the latency) of the UE1 will be downgraded in X seconds.

The QoS (e.g., the latency) of the UE1 will be downgraded in the location with the coordinates of (x, y, z), and in X seconds, The QoS of a group communication (group-cast) will be downgraded at cell number x, and The QoS (e.g., the latency) of the UE1 will be downgraded in the location with the coordinates of (x, y, z), and with a probability of X % (or the confidence interval).

Potential change in QoS (e.g., bit rate) with certain probability and/or confidence interval.

Moreover, the QoS function (e.g., the prediction functionality) may provide the notification of the changes in the QoS, based on the P-QoS outcome, and it may further include one or more of:

The PDU session ID (per PDU session P-QoS), PDU session type, Flow ID.

The vehicle-to-everything (V2X) communication service ID (per service/QoS Flow).

The type of the link including the sidelink (PC5), and/or the cellular communication (Uu).

The single or the group of the affected vehicle-to-everything user equipment (V2X-UE) IDs.

A QoS parameter (e.g., packet delay budget, bit rate) and/or 5QI ID that will change and/or event that will be triggered (e.g., out of coverage).

A proposal for a new level of the QoS that could be supported/provided.

A timing information of the change in the QoS or event triggered that may be applied.

A location information of the change in the QoS and/or the cell information about the change of the QoS and/or the identified event that may be applied.

A level of the QoS per user equipment (UE), e.g., <current QoS, new1 QoS, new2 QoS, etc.>.

A timing information of the UE, e.g., <start1, end1, start2, end2>.

A probabilistic information for the change in the QoS and/or the coverage.

FIGS. 6*a*, 6*b*, 7*a* and 7*b* illustrate different forms of implementations of providing the notification from the device 100 and/or its P-QoS function 100 to the V2X application entity using either a control plane and/or a user plane messages.

The notification may be, for example, the service ID, the V2X-UE ID, the QoS parameter (e.g., an old value of the QoS, a new value for the QoS, an event, a timing information that the changes in the QoS being applied, the geographical area that the changes in QoS being applied, probability of the QoS change, etc.).

The notification response may be, for example, ACK, NACK, negotiation of the parameters, etc.

Figures 6A, 6B:
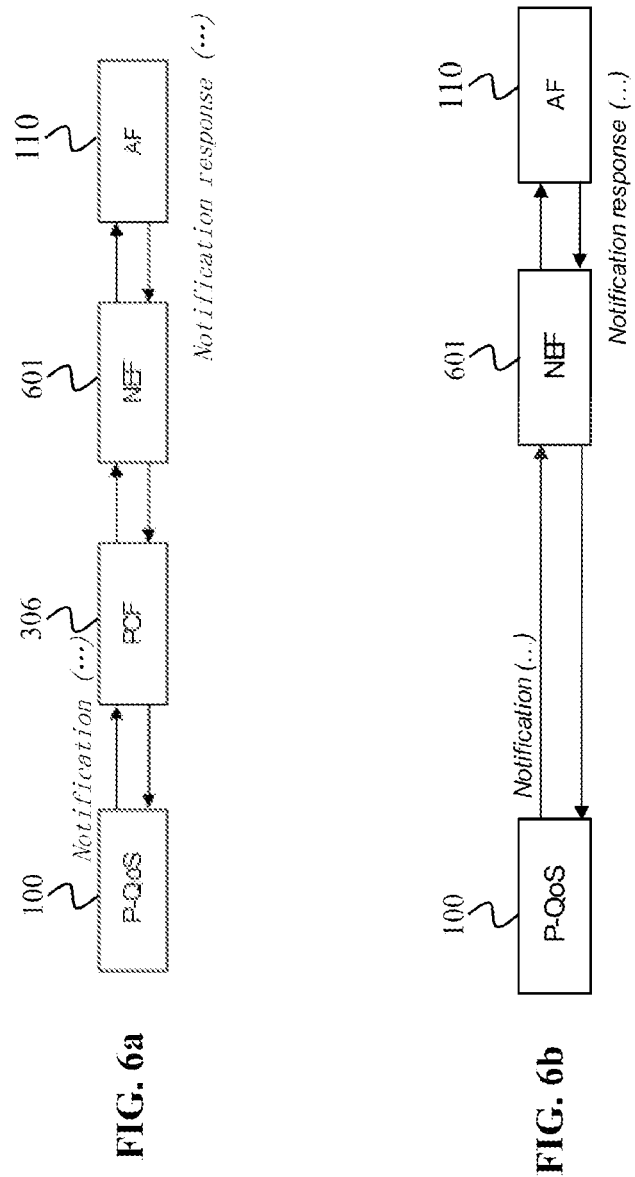
FIGS. 6a and 6b schematically illustrate examples of message sequence charts (MSCs) for notifying the changes in the QoS to an application function and an application server, respectively.

FIG. 6*a* and FIG. 6*b* schematically illustrate two examples of signaling options via the NEF 601 in the 5G networks. The notified destination node is the V2X application entity located at the AF 110, which can be a PLMN-owned application or a third party application.

Figure 7A:
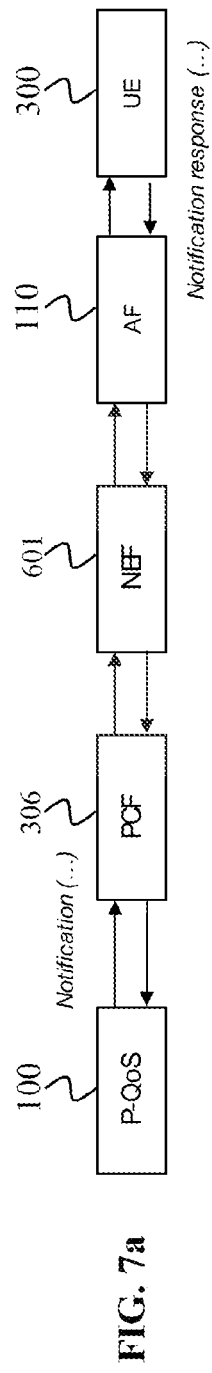
FIGS. 7a and 7b schematically illustrate examples of MSC for notifying the changes in the QoS to a V2X application entity of a user equipment (UE)
Figure 7B:
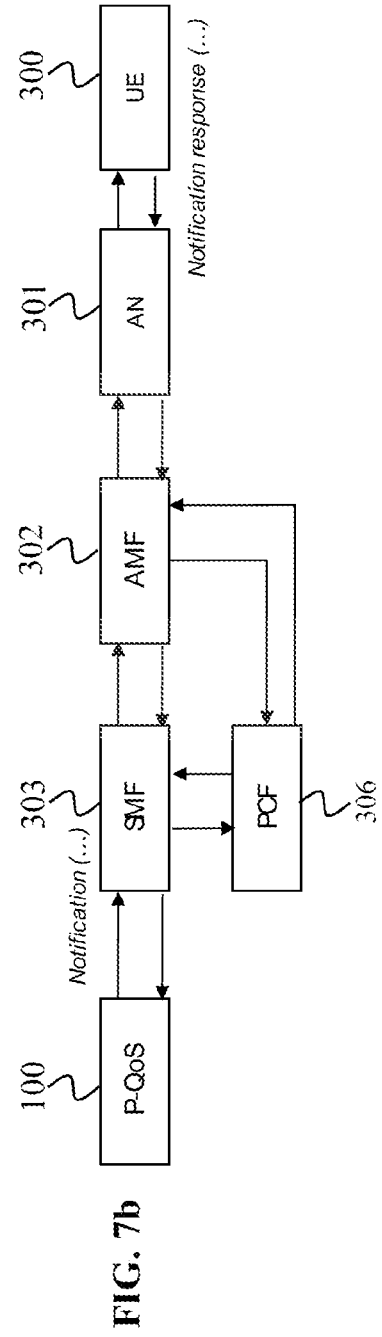

FIG. 7*a* and FIG. 7*b* schematically illustrate two examples of signaling options where the notified destination node is the V2X application entity located at the UE 300. In this case the notification may be sent either via the AF 110 or via the RAN interfaces (e.g., NAS, RRC). In the MSC example of the FIG. 7b, the SMF 303 is able to notify the PCF 306, if the QoS targets for a QoS flow cannot be fulfilled (in accordance to the "3GPP-23503"), and may further update it with an early notification information, etc.

For all of the above examples, the P-QoS functionality may notify the SMF 303 entity, and the latter may forward the notification for any change of the QoS or the coverage levels to the PCF 306. Then, the PCF 306 undertakes to transmit the notification message to the NEF 601, the AMF 302, and/or any other function or network entity.

For the (e.g. all potential) signaling options, the receiving V2X application entity may respond with a notification response message, for example, it may acknowledge the notification and/or accept or reject the new proposed QoS level (i.e. if the new proposed QoS level provided). In the case of the rejection, a negotiation of the QoS values between the network side and the V2X application entity may be initiated, and the later may propose a preferable alternative QoS level.

Alternatively, the outcomes of the P-QoS notification about the expected QoS and/or the coverage change may be transmitted to the network entities (e.g., BS, UPF, AMF, SMF, PCF, V2X-CF of the 5G system, etc.). Moreover, the appropriate re-configuration action may be triggered and decided by the network, for example, based on the type of the notification, and in order to maintain the initial agreed QoS level and/or optimize the network performance, etc.

Figure 8:
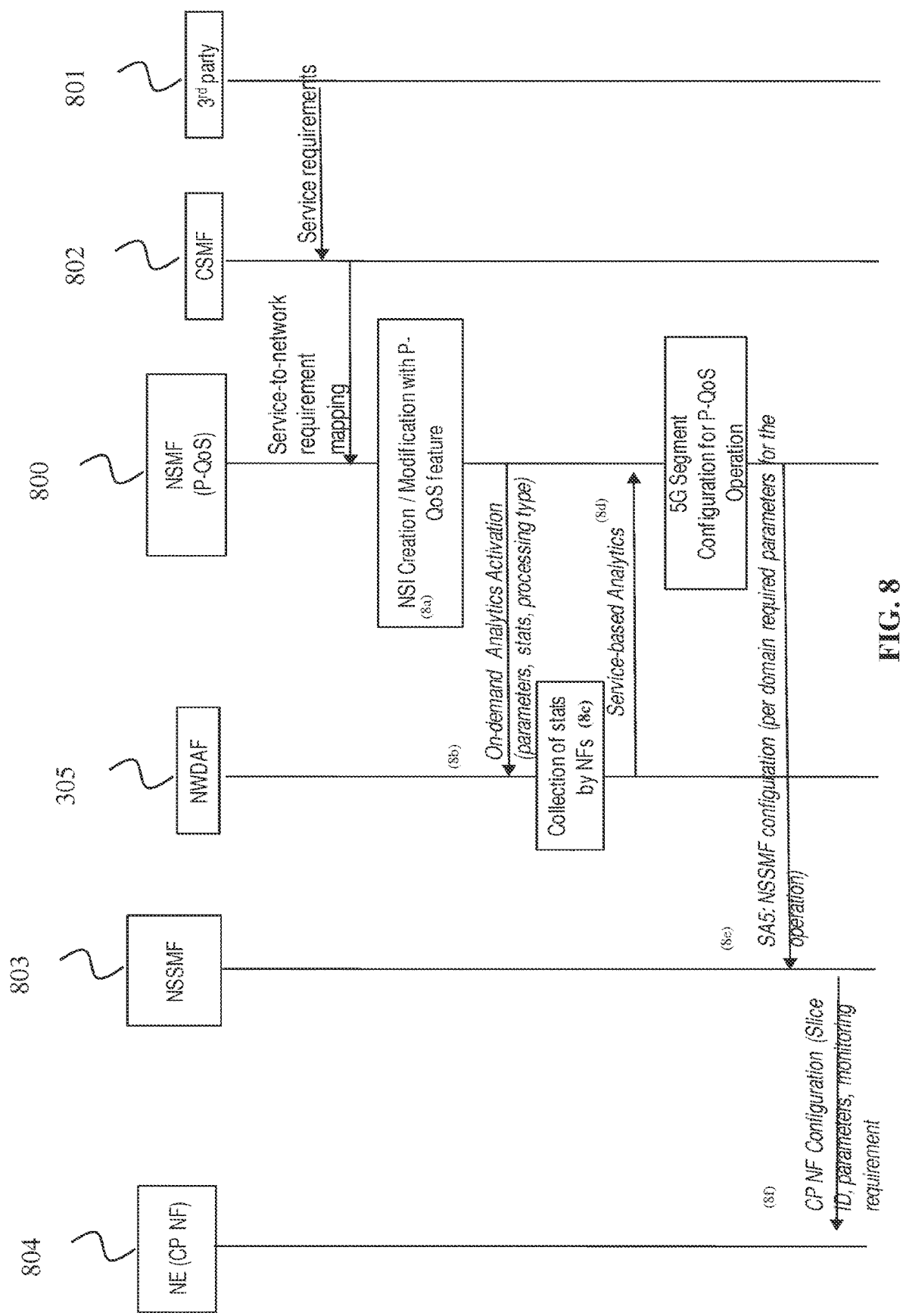
FIG. 8 schematically illustrates a procedure for a configuration of the P-QoS function by a Slice Management System.

FIG. 8 schematically illustrates a procedure for the configuration of the P-QoS function by the management plane, and particularly for the scenario of a slice-based architecture (i.e., V2X slice). As mentioned, the P-QoS function may be a feature which is required, for example, on demand, or it may be activated by default for a particular service.

The network slicing is a key 5G requirement for enabling the verticals to operate on an end-to-end logical sub-network, e.g., after an agreement with the network operator. The automotive sector is a key vertical for the 5G system, and the 5G-V2X is envisioned as a key slicing scenario.

The operator may provide the required network features, in order to meet the customized service requirements of the third party or the customer (e.g. OEM). The network features may be required, for meeting the slice KPIs, and the associated functions and resources. The P-QoS function may be one particular feature, which may be provided by default or on demand for a V2X slice.

Initially, the third party 801 (or customer) transmits some service requirements to the CSMF 802 which is the entity that translates the service requirements to the network requirements, from the management perspective. Next, the Network Slice Management Function (NSMF) 800 creates and/or modifies the network slice instances, and it further maps them to policies (e.g. radio resource management (RRM) policy, Network Function (NF) placement, scale in/out, slice coverage, etc.). The Communication Service Management Function (CSMF) 802, the NSMF 800, and the Network Slice Subnet Management Function (NSSMF) 803 are the slice management functionalities which comprise the slice management system as it is defined in technical specification document with the reference number of "3GPP-28530".

The process can be summarized as follows:

At step 8a, the Network Slice Instance (NSI) is created based on the application requirement, having the P-QoS feature.

At step 8b, the NSMF 800 initially activates, e.g., on demand, the required analytics from the NWDAF 305 (as an activation msg0).

At step 8c, the NWDAF 305 collects the analytics from the related network functions (core and/or RAN control functions that are relevant to monitor the QoS, the resource situation, and the events).

At step 8d, the NSMF 800 receives the on demand analytics, and it configures the different segments of the 5GS (e.g., the RAN, the TN, the CN), accordingly.

At step 8e, the NSMF 800 sends the per-segment configuration to the NSSMF 803 for enabling the P-QoS, which includes parameters for the P-QoS activation and management.

At step 8f, the NSSMF 803 sends this information to the managed Network Element (NE) 804, e.g., the control panel (CP) function. The NE 804 can be the PCF which is responsible (e.g., from the control-plane perspective) for providing policies for different domains (e.g., the CN, the RAN).

At step 8g (not shown) the NE 804 or the PCF applies the configuration or the policies to the underlying 5GS.

Figure 9:
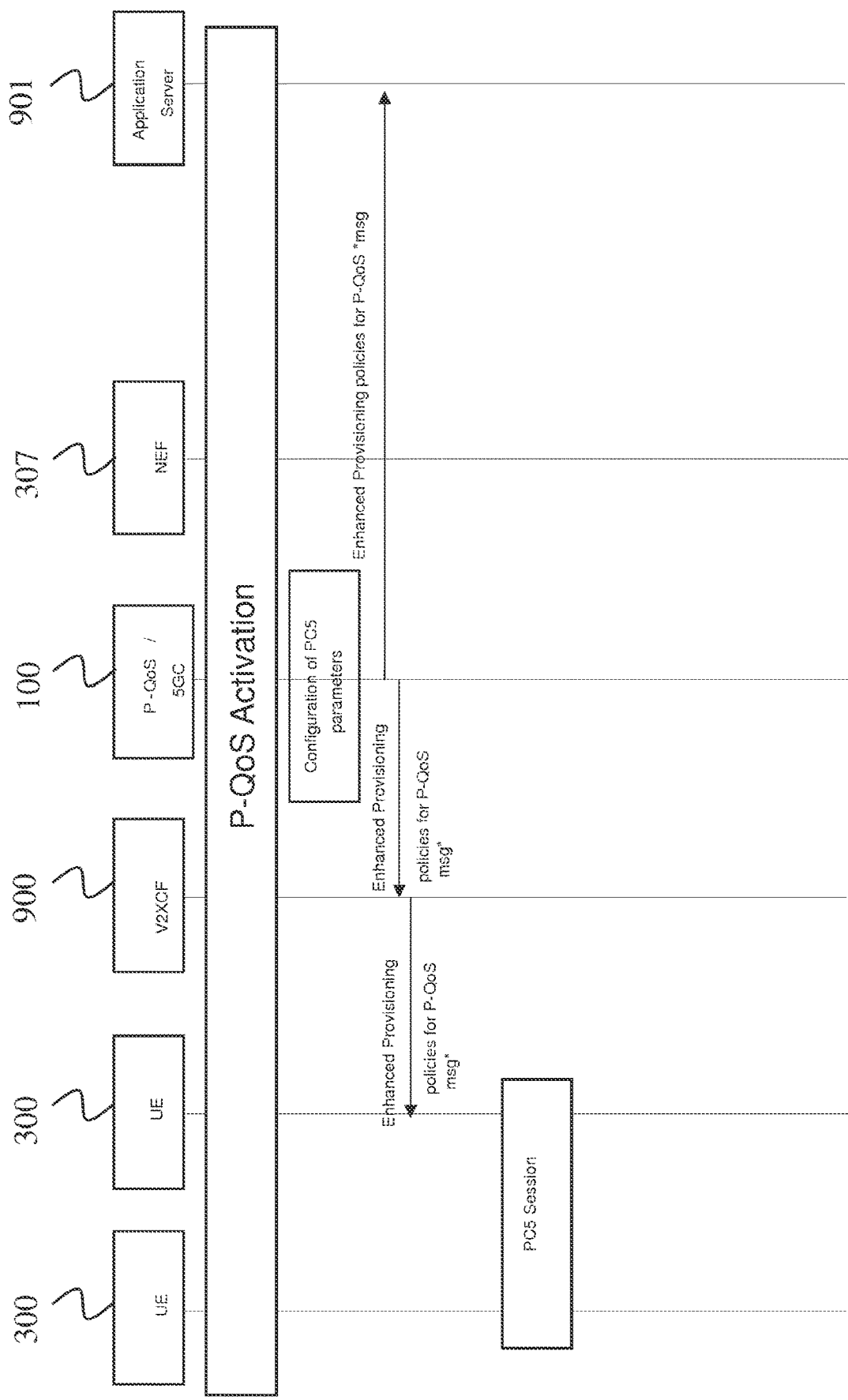
FIG. 9 schematically illustrates a procedure for a configuration of the PC5 parameters for the P-QoS function.

FIG. 9 schematically illustrates a procedure for a configuration of the PC5 parameters for the P-QoS function.

In some embodiments, for example, in the cases of the V2V communications, a V2X Control Function (V2XCF) 900 is provided. The V2XCF 900 is a network function for provision of the Sidelink (PC5) parameters to the UE 300. In addition, the QoS function (e.g., the QoS model) for the PC5 includes the proximity services (ProSE) per packet priorities (PPPP), and the reliability (PPPR) provisioning to the UE 300 for the sidelink operation.

In the following, an embodiment for the configuration of the PC5 parameters for the QoS function (e.g., the P-QoS functionality) is described. Moreover, there might be an interworking of the Uu and the PC5, and a unified QoS model may be provided. To this end, the P-QoS function provisions the P-QoS parameters which includes the predicted or expected changes (QoS characteristics/PPPPs/5QIs and the mapping to the QoS attributes) for the PC5 session.

A message is transmitted from the device 100 (e.g., its P-QoS function) to the V2XCF 900, and/or the application server 901 and/or the UE 300 (via the V2XCF 900). The message is representative of an enhanced provisioning policies for the P-QoS message, and it includes the PC5 provisioning parameters as it is defined in technical specification documents with the reference numbers of "3GPP-24386" and "3GPP-23786".

The transmitted message includes one or more of:

The sidelink, PC5, parameter.

A mapping of proximity services, ProSE, per packet priorities quality of service, PPPP/QoS, class to packet delay budget, PDB, and packet error rate, PER, for a current QoS, and the predicted change in the QoS.

A radio parameter for the current QoS, and the determined change in the QoS.

A timer information, Txxxx, indicating the UE changing the radio parameters or mapping of the proximity services, ProSE, per packet priorities, PPPP, for the vehicle-to-everything, V2X, communication service over the sidelink, PC5.

Figure 10:
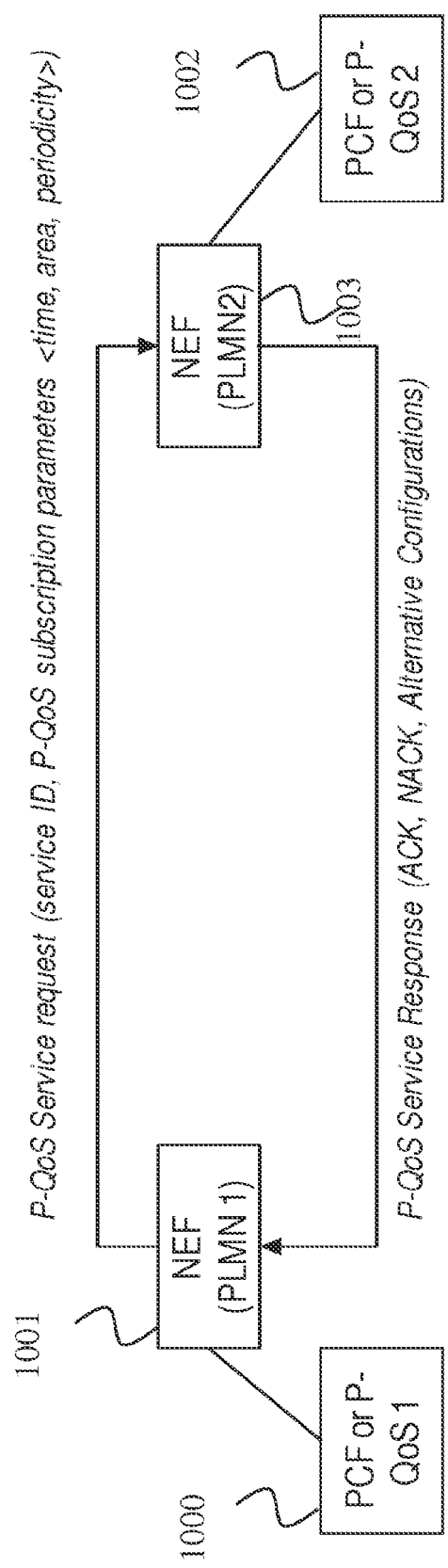
FIG. 10 schematically illustrates a procedure for transmitting a P-QoS subscription request based on an inter NEF interaction, in a Multi-MNO environment using a roaming service.

FIG. 10 schematically illustrates a procedure for providing a P-QoS function in a Multi-MNO environment.

In some embodiments, a UE (e.g., a vehicle) may enable the P-QoS functionality. Furthermore, its subscription to the QoS function (e.g., the P-QoS functionality) of a V2X service may be activated and/or it may be connected to an MNO with a QoS function. The UE may further move to a second MNO (e.g., a national MNO, a cross-border MNO). In such a case, it may be required to, for example, before the actual roaming (for the service continuity, the reliability, and the availability of the P-QoS function), request the second MNO (i.e., the target MNO), whether the same P-QoS capabilities and/or configuration are supported. In other words, an extension of the subscription may be requested.

The interaction between the MNOs may take place, for example:
either via the NEF interfaces that both MNOs have, or via the AFs dedicated for this purpose, or
via the inter PLMN-control plane signaling.

FIG. 10 schematically illustrates a procedure for transmitting a P-QoS subscription request based on an inter NEF interaction, in a Multi-MNO environment, using a roaming service.

As discussed, a subscription request of the application entity in the first communication network may be transmitted to a network entity in the second communication network. The subscription request may include the QoS service request message for determining, upon a roaming of the application entity from the first communication network to the second communication network, whether the QoS function for the communication service of the application entity is supported in the second communication network.

In FIG. 10, the PLMN/MNO1 asks via a P-QoS service request message whether the P-QoS subscription parameters for a V2X Service of one or more UEs could be supported, when the UE moves to the second PLMN/MNO2.

The PLMN 1 includes the PCF Point coordinates function (1000) (or P-QoS 1), and the Network Exposure function (NEF) 1001 (NEF PLMN1). Moreover, the PLMN 2 includes the PCF 1002 (or P-QoS 2), and the NEF 1003 (NEF PLMN2).

The PLMN/MNO2 responds with the ACK or the NACK. In the case of NACK (i.e., P-QoS service response message), it may propose, an optional alternative supported configuration. As discussed, the interaction between the MNOs may take place via the NEF or the AFs.

Figures 11A, 11B:
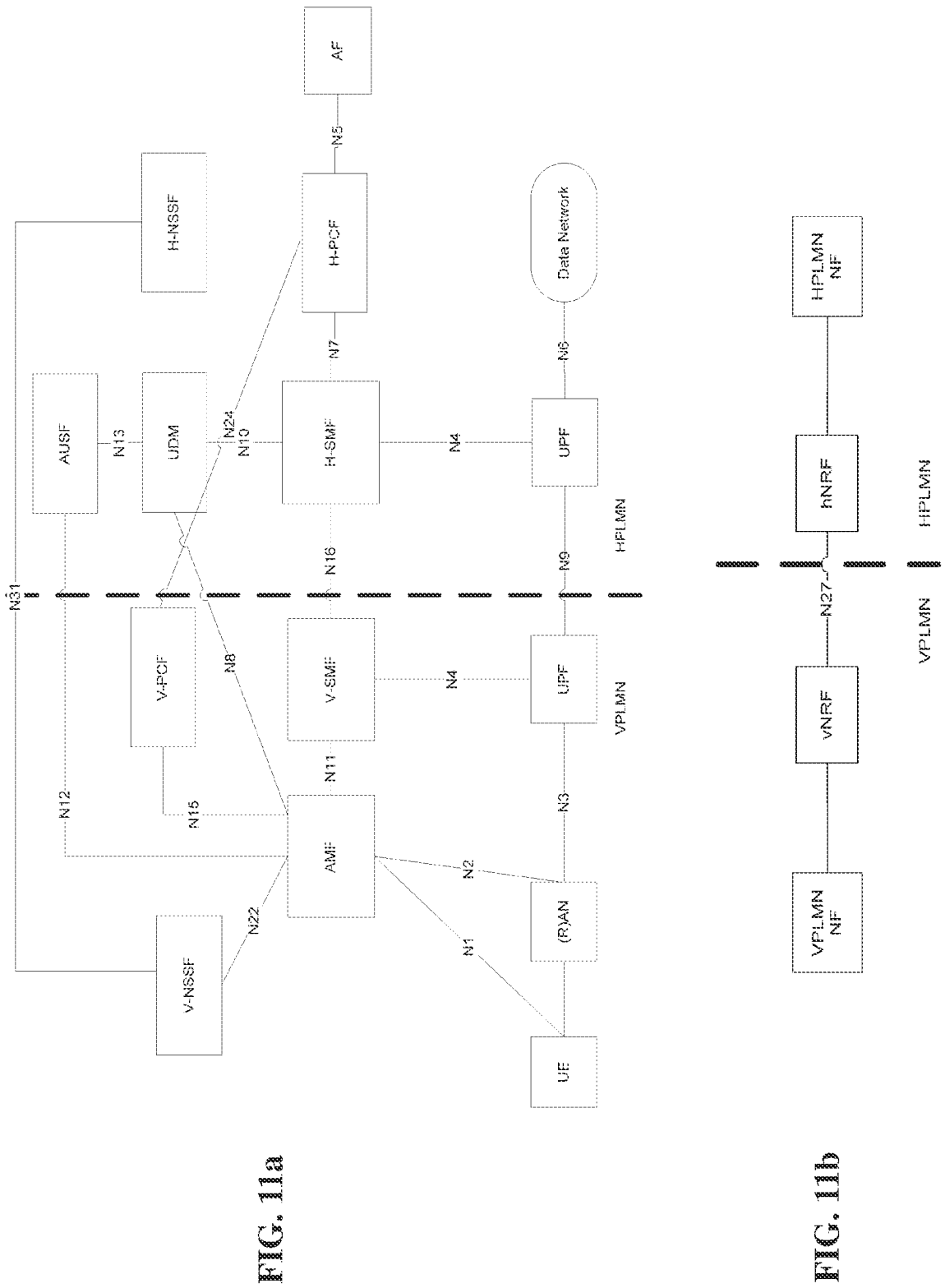
FIGS. 11a and 11b schematically illustrate a procedure for transmitting a P-QoS subscription request based on an inter-PLMN control plane, in a Multi-MNO environment using a roaming service.

FIG. 11a and FIG. 11b schematically illustrate a procedure for transmitting a P-QoS subscription request based on an inter-PLMN control plane, in a Multi-MNO environment, using a roaming service.

In FIG. 11a and FIG. 11b, the interactions between the MNOs for the request of the P-QoS capabilities and/or the configuration that could be supported, i.e., by the second MNO are performed via the inter PLMN interfaces.

For instance, in FIG. 11a, the N24 and the N32 reference points of the 5G system architecture, according to the technical specification document with the reference number of "3GPP-23501" may be used for, e.g., the P-QoS service request, the response messages, and the subscription of the P-QoS capabilities to another MNO/PLMN.

In addition, in FIG. 11b, the N27 (between NRFs) may be used for inter-PLMN P-QoS service discovery function (e.g., the query, the response). For example, in the cases that the PLMN/MNO1 needs to check if the PLMN/MNO2 provides any P-QoS service.

In some embodiments, the QoS function (e.g., the prediction of the QoS) may be provided, for example, when two or more UEs are attached at different MNOs and they communicate via the cellular (Uu) and/or the Sidelink (PC5) interfaces (i.e. an identical or with different frequency bands).

For instance, the vehicle-to-network-to-vehicle (V2N2V) communication may be performed between two or more vehicles attached at different MNOs, e.g., sensor sharing, cooperative maneuver, etc. Moreover, the prediction of the changes in the QoS may require an exchange of the prediction results (e.g., by a notifications) for a session of the V2X service that involves vehicles which are attached at different MNOs.

For example, the PLMN1 may detect an expected change of the QoS, based on its individual P-QoS calculations. Moreover, the PLMN1 may notify both of the vehicles that are attached at its own network, and it may also notify the other involved vehicles that are attached at the PLMN2.

The messages representing notification of the changes in the QoS may include a proposed supported QoS level. A detailed description of the notification of the QoS changes is described above (e.g., in FIG. 6a, FIG. 6b, FIG. 7a, and FIG. 7b). Similarly, the other vehicles (of the same or the other MNOs) may accept or reject, and/or negotiate the new QoS that could be supported, e.g., by the triggering the corresponding MNO.

FIG. 12a, FIG. 12b, and FIG. 12c schematically illustrate message sequence charts for providing QoS function in a Multi-MNO environment, where the application entities are attached at different MNOs.

In FIG. 12a, FIG. 12b, and FIG. 12c, three alternative implementation forms of the MSC are illustrated for the interaction between different MNOs, and consequently, the transmission of the notification messages to the V2X application entities (e.g., in UEs) that are attached to different MNOs.

FIG. 12a illustrates an interaction between different MNOs, based on the NEF interfaces or AFs. The PLMN 1 including the PCF 1200 (or P-QoS 1), and the NEF 1201 (NEF PLMN1) communities with the PLMN 2 includes the PCF 12002 (or P-QoS 2), and the NEF 1203 (NEF PLMN2). The communication between the MNOs is performed based on the the NEF interfaces.

FIG. 12b illustrates an interaction between different MNOs, based on the control plane interfaces, which may be the N24 and the N32 (i.e. reference points of the 5G system architecture "3GPP-23501", as it is described in FIG. 11a). The control plane interfaces may be used for the notification and the notification response messages to the other MNO/PLMN. For example, the second MNO may undertake to forward the notifications to the appropriate V2X application entities (e.g., of the UEs) that are attached to the first MNO.

In FIG. 12b, the PLMN 1 including the P-QoS1 1204, and the PCF 1205 communities with the PLMN 2 which includes the P-QoS2 1206 and the PCF 1207. The communication between the MNOs is performed based on the control plane interfaces.

FIG. 12c illustrates an interaction between different MNOs, based on the sidelink interface (PC5). The vehicles exchange notification messages that have received from their MNOs (i.e. MNO that they are attached to it). Similarly, the corresponding notification responses is transmitted via the sidelink interface using either sidelink control plane (e.g., RRC) and/or the user plane messages.

In some embodiments, the discussed three implementation forms of FIG. 12a, FIG. 12b, and FIG. 12c may be used either for the cellular Uu (V2N2V) or the sidelink/PC5 communication between two or more UEs.

Figure 13:
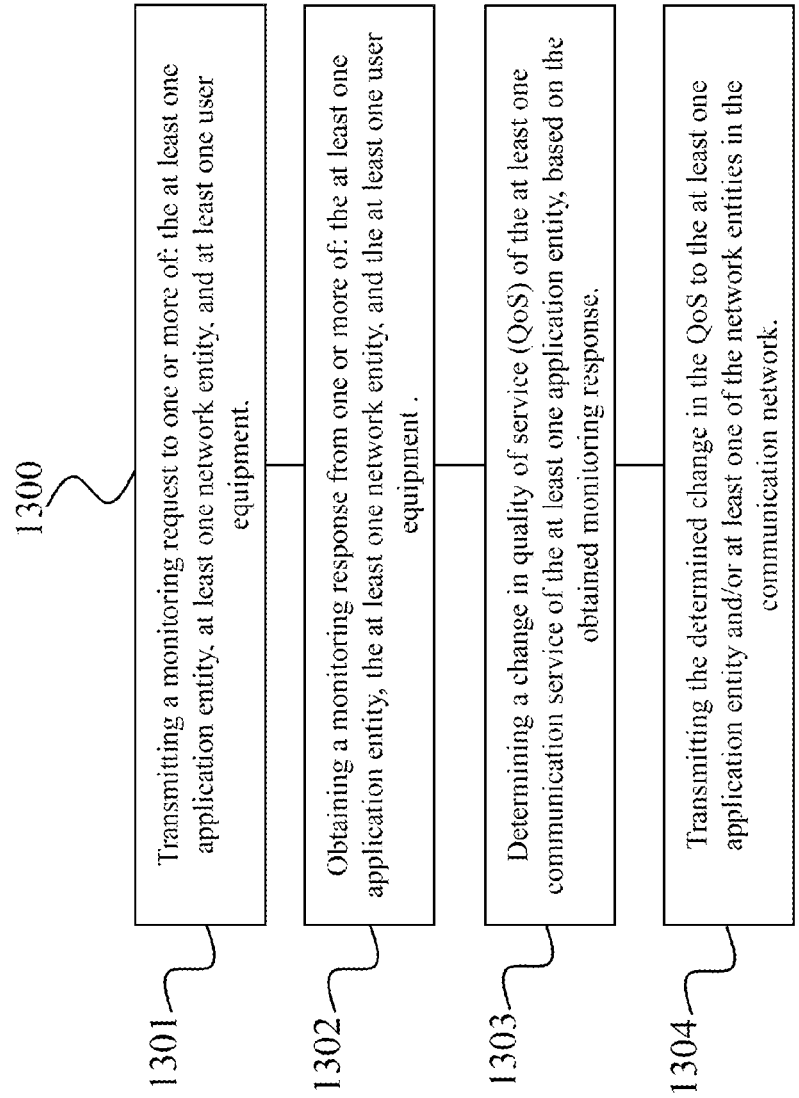
FIG. 13 shows a schematic view of a method for providing a quality of service (QoS) function, for a communication service of an application entity in a communication network, according to an embodiment of the disclosure.

FIG. 13 shows a method 1300 according to an embodiment of the disclosure for providing a quality of service (QoS) function, for a communication service 111 of an application entity 110 in a communication network 1 comprising a plurality of network entities 112, 113, 114. The method 1300 may be carried out by the device 100, as it described above.

The method 1300 comprises a step 1301 of transmitting a monitoring request to one or more of: the at least one application entity, at least one network entity, and at least one user equipment.

The method 1300 further comprises a step 1302 of obtaining a monitoring response from one or more of: the at least one application entity, the at least one network entity, and the at least one user equipment.

The method 1300 further comprises a step 1303 of determining a change in quality of service (QoS) of the at least one communication service of the at least one application entity, based on the obtained monitoring response.

The method 1300 further comprises a step 1304 of transmitting the determined change in the QoS to the at least one application entity and/or at least one of the network entities in the communication network.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for providing a quality of service (QoS) function for at least one communication service of at least one application entity in a communication network that includes a plurality of network entities, the device comprising at least one hardware element configured to:
   transmit a monitoring request to one or more of: the at least one application entity, at least one network entity, or at least one user equipment;
   obtain a monitoring response from one or more of: the at least one application entity, the at least one network entity, or the at least one user equipment;
   determine a change in quality of service (QoS) of the at least one communication service of the at least one application entity, based on the monitoring response;
   transmit information based on the change in the QoS of the at least one communication service of the at least one application entity to one or more of: the at least one application entity or one or more network entities of the plurality of network entities in the communication network; and
   provide an alert notification to one or more of the at least one application entity or the one or more network entities of the plurality of network entities, being indicative of an accuracy of the change in the QoS of the at least one communication service of the at least one application entity.

2. The device according to claim 1, wherein the at least one hardware element is further configured to:
   activate, in response to a subscription request of the at least one application entity, a subscription of the at least one application entity to the QoS function, for determining the change in the QoS of the at least one communication service of the at least one application entity.

3. The device according to claim 1, wherein the at least one hardware element is further configured to:
   notify the change in the QoS to one or more of: the at least one application entity or one or more network entities of the plurality of network entities, by providing an additional QoS indicating the change in the QoS.

4. The device according to claim 2, wherein the subscription of the at least one application entity to the QoS function is activated based on a subscription parameter provided from the at least one application entity to the communication network.

5. The device according to claim 4, wherein the subscription parameter includes one or more of:
   a protocol data unit (PDU) session identification number (PDU session ID);
   a vehicle-to-everything communication service identification number (V2X communication service ID);
   a single or a group of affected vehicle-to-everything user equipment identification numbers (V2X-UE IDs);
   a timing window and/or a frequency of the subscription request to the QoS function;
   a time horizon for determining the change in the QoS of the at least one communication service;
   a predefined geographical area for determining the change in the QoS of the at least one communication service;
   a threshold value of the change in the QoS of the at least one communication service;
   a duration time of the at least one communication service;
   a segment-based subscription or an end to end, E2E, subscription to the QoS function;
   a required capability and a monitoring exposure to the at least one application entity;
   a required QoS for the at least one communication service;
   one or more alternative QoS levels that could be used, in response to determining that a primary QoS is not available; or
   a type of a link including Sidelink (PC5) and/or Cellular communication (Uu).

6. The device according to claim 1, wherein the monitoring request includes one or more of:
   a monitoring parameter;
   a monitoring level;
   a duration time and a granularity of the monitoring response; or
   a location information of the monitoring request.

7. The device according to claim 1, wherein the change in the QoS of the at least one communication service is determined based on one or more of:
   mobility information of the at least one application entity;
   a behavior of the at least one application entity;
   map information;
   historic information representing a combination of: the location of the at least one user equipment and/or the communication network and/or radio information; or
   characteristics of the communication network.

8. The device according to claim 3, wherein notifying the change in the QoS comprises providing a notification to one or more of the at least one application entity or the one or more network entities of the plurality of network entities, based on a type of the at least one communication service, including at least one of Sidelink communication (PC5) and/or Cellular communication (Uu).

9. The device according to claim 3, wherein notifying the change in the QoS comprises providing a notification to one or more of the at least one application entity or the one or more network entities of the plurality of network entities, including one or more of:
- a protocol data unit (PDU) session identification number (PDU session ID);
- a vehicle-to-everything communication service identification number (V2X communication service ID);
- a type of a link including Sidelink (PC5) communication and/or Cellular communication (Uu);
- a single or a group of affected vehicle-to-everything user equipment identification numbers (V2X-UE IDs);
- a QoS parameter;
- a proposal for a new level of the QoS;
- timing information of the change in the QoS;
- location information of the change in the QoS;
- a level of the QoS per user equipment;
- timing information of the user equipment; or
- probabilistic information for the change in the QoS.

10. The device according to claim 1, wherein the at least one communication service includes a vehicle-to-everything (V2X) communication service.

11. The device according to claim 10, wherein the at least one application entity is based on a vehicle-to-everything (V2X) application entity.

12. The device according to claim 11, wherein the V2X application entity includes one or more of:
- an application server for the V2X communication service;
- a V2X application client being representative of a user equipment;
- an application function (AF) being representative of a public land mobile network-owned (PLMN-owned) application function; or
- a middleware application entity located between the application server and the communication network.

13. The device according to claim 12, wherein the application server for the V2X communication service includes one or more of:
- a V2X application server (V2X AS);
- a group-communications system application server (GCS-AS); or
- a content provider.

14. The device according to claim 1, wherein the at least one hardware element is further configured to:
determine the change in the QoS of the at least one communication service based on a slice based architecture.

15. The device according to claim 1, wherein the at least one communication service is based on a direct vehicle-to-vehicle (V2V) communication service, and the at least one application entity is based on a first user equipment.

16. The device according to claim 15, wherein the at least one hardware element is further configured to:
provide a vehicle-to-everything control function (V2XCF) for providing a sidelink parameter to the first user equipment.

17. The device according to claim 16, wherein the at least one hardware element is further configured to:
provide, via the V2XCF, a notification message to the first user equipment, wherein the notification message is representative of an enhanced provisioning policy for the QoS function.

18. The device according to claim 17, wherein the notification message provided to the first user equipment includes one or more of:
- the sidelink parameter;
- a mapping of proximity services (ProSE), per packet priorities quality of service (PPPP/QoS), class to packet delay budget (PDB), and packet error rate (PER) for a current QoS, and the predicted change in the QoS;
- a radio parameter for the current QoS, and the change in the QoS; or
- timer information indicating the first user equipment changing radio parameters or mapping of the ProSE PPPP for a vehicle-to-everything (V2X) communication service over sidelink (PC5) communication.

19. The device according to claim 1, wherein the communication system is based on a 5G communication system.

20. The device according to claim 1, wherein the at least one hardware element is further configured to:
trigger a network reconfiguration based on the change in the QoS for maintaining a specific QoS level.

21. The device according to claim 2, wherein the at least one hardware element is further configured to:
deactivate and/or modify the subscription of the at least one application entity to the QoS function.

22. A method for providing a quality of service (QoS) function for at least one communication service of at least one application entity in a communication network that includes a plurality of network entities, the method comprising:
transmitting a monitoring request to one or more of: the at least one application entity, at least one network entity, and at least one user equipment;
obtaining a monitoring response from one or more of: the at least one application entity, the at least one network entity, or the at least one user equipment;
determining a change in quality of service (QoS) of the at least one communication service of the at least one application entity, based on the monitoring response;
transmitting information based on the change in the QoS of the at least one communication service of the at least one application entity to one or more of: the at least one application entity or one or more network entities of the plurality of network entities in the communication network; and
providing an alert notification to one or more of the at least one application entity or the one or more network entities of the plurality of network entities, being indicative of an accuracy of the change in the QoS of the at least one communication service of the at least one application entity.

* * * * *